United States Patent
Stumpf

(10) Patent No.: US 8,091,437 B2
(45) Date of Patent: Jan. 10, 2012

(54) TRANSDUCER MATRIX FILM

(76) Inventor: John Stumpf, Phoenix, AZ (US)

( * ) Notice: Subject to any disclaimer, the term of this patent is extended or adjusted under 35 U.S.C. 154(b) by 106 days.

(21) Appl. No.: 12/387,428

(22) Filed: May 2, 2009

(65) Prior Publication Data

US 2009/0272206 A1 Nov. 5, 2009

Related U.S. Application Data

(60) Provisional application No. 61/050,524, filed on May 5, 2008.

(51) Int. Cl.
*G01D 7/00* (2006.01)
(52) U.S. Cl. .................... 73/862.041; 73/777
(58) Field of Classification Search ......... 73/862.041–862.046, 777
See application file for complete search history.

(56) References Cited

U.S. PATENT DOCUMENTS

| | | | | |
|---|---|---|---|---|
| 4,392,162 A * | 7/1983 | Yamamoto | ..................... | 386/200 |
| 4,791,311 A * | 12/1988 | Vig | ............... | 307/10.1 |
| 5,571,973 A * | 11/1996 | Taylot | ..................... | 73/862.046 |
| 5,668,318 A * | 9/1997 | Okada | ..................... | 73/504.11 |
| 5,911,158 A | 6/1999 | Henderson et al. | | |
| 6,707,308 B1 | 3/2004 | Michalewicz | | |
| 6,809,529 B2 * | 10/2004 | Okada et al. | ................. | 324/681 |
| 7,409,876 B2 * | 8/2008 | Ganapathi et al. | ....... | 73/862.046 |
| 7,673,528 B2 * | 3/2010 | Yoon et al. | ............... | 73/862.041 |
| 2002/0073785 A1 | 6/2002 | Prakask et al. | | |
| 2006/0272429 A1 | 12/2006 | Ganapathi et al. | | |
| 2006/0273417 A1 | 12/2006 | Ganapathi et al. | | |
| 2006/0283266 A1 * | 12/2006 | Qing et al. | ............... | 73/862.041 |
| 2007/0107494 A1 | 5/2007 | Rezgui | | |
| 2009/0134318 A1 * | 5/2009 | Kuniyoshi et al. | ........ | 250/231.19 |
| 2010/0175486 A1 * | 7/2010 | Chang et al. | ............. | 73/862.044 |
| 2010/0274447 A1 * | 10/2010 | Stumpf | ........................... | 701/36 |
| 2010/0304931 A1 * | 12/2010 | Stumpf | ............... | 482/4 |

OTHER PUBLICATIONS

Lichtenwalner et al., "Flexible thin film temperature and strain sensor array utilizing a novel sensing concept", Sensors and Actuators A 135 (2007) 593-597, Elsevier.
"For Computer Chips, Press "Print"", MIT Technology Insider (newletter) Apr. 2009.
http://www.omega.com/literature/transactions/volume3/strain2.html viewed Apr. 9, 2008.
http://www.nanosolar.com/printsemi.htm viewed Apr. 9, 2008.
http://www.nanosolar.com/rollprocessing.htm viewed Apr. 9, 2008.
http://en.wikipedia.org/wiki/Piezoresistor viewed Apr. 9, 2008.
http://en.wikipedia.org/wiki/Strain_gauge viewed Apr. 9, 2008.
http://www.news.wisc.edu/12718 viewed Apr. 9, 2008.
Sampath et al., "Innovative Multifunctional Concepts Enabled by Novel Fabrication Strategies" report dated Oct. 1, 2006.
http://www.omega.com online strain gauge catalog pages created Apr. 26, 2007.

* cited by examiner

*Primary Examiner* — Max Noori
(74) *Attorney, Agent, or Firm* — Snell & Wilmer L.L.P.

(57) ABSTRACT

A transducer system includes a plurality of transducer elements formed on a flexible substrate with localized circuit elements and interconnects associated with each transducer element.

29 Claims, 14 Drawing Sheets

TRANSDUCER MATRIX FILM

CROSS-REFERENCE TO RELATED APPLICATIONS

This application claims priority to U.S. provisional application Ser. No. 61/050,524, filed May 5, 2008, entitled STRAIN GAUGE MATRIX FILM which application is incorporated herein by reference.

BACKGROUND

The present disclosure relates to arrayed transducer systems with sensory measurement and actuation capabilities. Transducers may be designed to measure and/or actuate in response to a multitude of sensory information such as strain, temperature, light and electromagnetic radiation. Strain is a geometrical measure of the deformation of an object resulting from an applied stress. Stress may be applied to an object via mechanical contact, aerodynamic forces, hydrodynamic forces and/or changes in temperature. Resultant strain and therefore the applied stress may be measured by use of various types of strain gauge sensors.

Temperature is an inherent property of all objects. Temperature of an object may be changed by the addition or subtraction of heat. Temperature may be measured by the use of temperature sensitive elements such as strain gauges, resistive temperature detectors ("RTDs"), thermistors and thermocouples. Light may be emitted by devices such as photodiodes, lasers, light emitting diodes ("LEDs") and sensed by devices such as photodiodes, phototransistors and solar cell elements.

Electromagnetic radiation such as radio frequency ("RF") energy may be emitted or sensed by the use of RF antennae such as used for radio frequency identification ("RFID") systems. Transduction of sensory information such as temperature and imparted forces are important for characterizing a wide variety of systems and processes including mechanical systems such as fabrication machines, vehicles and aircraft in both static and dynamic environments as well as human and/or animal motion. Measurement and actuation capabilities also provide methods for measuring change and incorporating feedback in monitored systems.

SUMMARY

In an embodiment, a transducer system includes a plurality of transducer elements formed on a flexible substrate with localized circuit elements and interconnects associated with each transducer element which may transduce a stimulus such as stress, pressure, shear, strain, light, heat, electromagnetic energy, RF radiation and temperature.

In an embodiment, using a transducer system includes: configuring, deploying, triggering and transducing data with the transducer system.

In an embodiment, diagnosing a processing machine includes initially configuring a processing machine, supplying a transducer system, deploying the transducer system and determining processing parameters of the processing machine.

In an embodiment, measuring forces applied to an object includes supplying a transducer matrix film, deploying the transducer matrix film onto a surface of the object and transducing force data with the transducer matrix film.

In an embodiment, a fluid-dynamically controllable vehicle includes a controllable surface, a transducer matrix film associated with the controllable surface and an actuator for controlling the controllable surface in response to the transducer matrix film.

In an embodiment, a medical appliance includes a transducer matrix film formed to fit a portion of a body and an external device for controlling the transducer matrix film.

In an embodiment, an article for sensory transduction includes: a plurality of transducer elements formed on a flexible substrate with localized circuit elements and interconnects associated with each transducer element and an external device for controlling the transducer elements and localized circuit elements.

In an embodiment, a system for sensory communication includes a first transducer matrix film, a first external device connected with the first transducer matrix film, a second external device in communication with the first external device and a second transducer matrix film connected with the second external device.

In an embodiment, a method for sensory communication includes activating a first transducer matrix film, processing a signal from the first transducer matrix film, transferring the signal after processing, receiving the signal after transferring and activating a second transducer matrix film.

BRIEF DESCRIPTION OF DRAWINGS

The present disclosure may be understood by reference to the following detailed description taken in conjunction with the drawings briefly described below. It is noted that, for purposes of illustrative clarity, certain elements in the drawings may not be drawn to scale.

DETAILED DESCRIPTION OF ILLUSTRATED EMBODIMENTS

To overcome the shortcomings of prior art systems, the present invention generally includes a system and method for transducing sensory information such as strain, temperature, light and electromagnetic radiation. Transducing sensory information may be defined as measuring and/or actuating in response to sensory information. Prior art systems often are designed only for uni-axial sensing, not measurement and actuation, are not stand-alone and require external systems for signal conditioning, etc. For example, U.S. Pat. No. 5,911,158, (hereinafter, the "'158 patent"), entitled PIEZOELECTRIC STRAIN SENSOR ARRAY, describes a piezoelectric strain sensor array formed from polyvinylidene fluoride ("PVDF") film for use in monitoring dynamic responses of a physical structure such as aircraft. The '158 patent describes strain sensor arrays which "can be easily made in various sizes and smaller sizes can be easily made by simply cutting larger sizes with a scissors." The article "Flexible thin film temperature and strain sensor array utilizing a novel sensing concept" by Lichtenwalner et al. describes the design and fabrication of flexible arrays of resistive temperature and strain sensors on polyimide sheets. Sensor Products Inc. of Madison, N.J. and Tekscan, Inc. of South Boston, Mass. provides a variety of products for pressure sensing such as Tactilus®, Sigma-NIP® (SPI) and I-Scan® (Tekscan).

These prior art systems have complex wiring arrangements and delocalized signal processing which limits their functionality for in situ and/or remote applications. The present invention describes transducer matrix film: arrayed transducer elements formed on a flexible substrate in association with localized circuitry for processing signals to/from transducer elements, for identifying locations of transducer elements within an assembly of transducer elements and for simplifying interconnects and communication to external devices. Other advantages of the current invention will be described below in association with embodiments.

Figure 1:
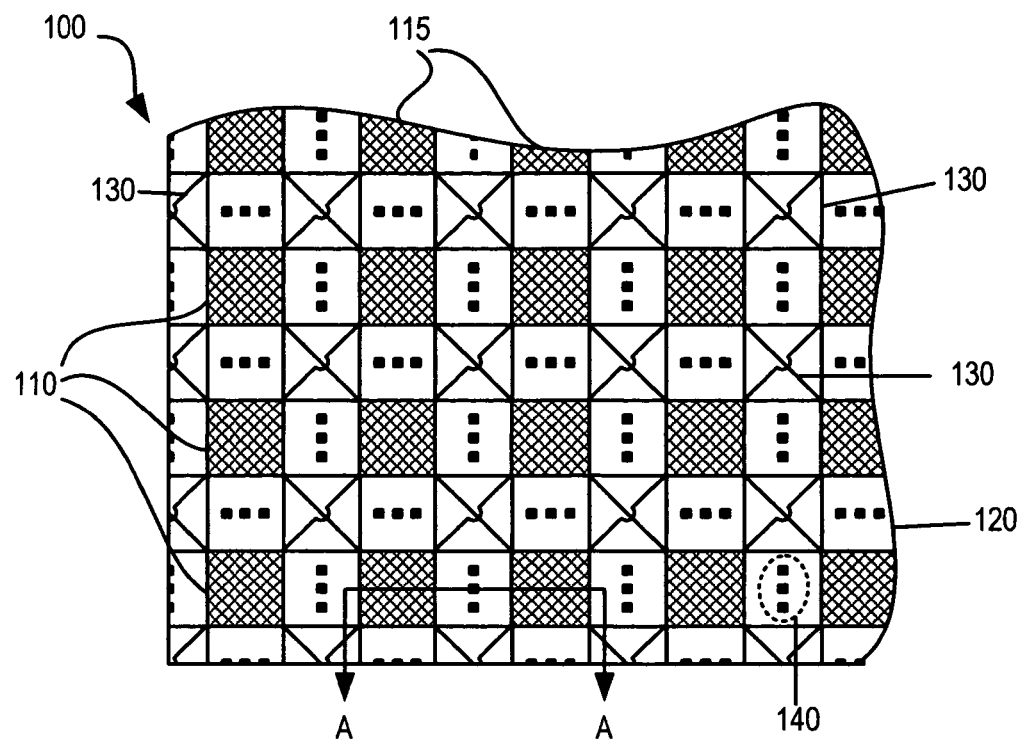
FIG. 1 is a plan view of a portion of transducer matrix film including square transduction cells organized into a regular square array, in accordance with an embodiment.

FIG. 1 shows a plan view of a portion of transducer matrix film 100 including a plurality of square transduction cells 110 organized into a regular square array. For illustrative clarity, not all transduction cells 110 in FIG. 1 are labeled. Partial transduction cells 115 may be transduction cells that are damaged or truncated due to cutting of transducer matrix film 100 and may therefore be inoperable. For illustrative clarity, not all partial transduction cells 115 in FIG. 1 are labeled. Each transduction cell 110 may include one or more transducer elements such as strain sensing elements, strain actuating elements, temperature sensing elements and/or temperature actuating elements. Each transduction cell 110 may also include integrated circuitry for conditioning signals to/from transducer elements. Integrated circuitry within each transduction cell 110 may also function to identify a unique position for each transduction cell 110 within transducer matrix film 100. Transduction cells 110 are described in further detail herein below with respect to FIG. 5.

Thus transducer matrix film 100 provides transduction (sensory data measurement and/or sensory actuation) at discrete locations over an extent of transducer matrix film 100. Transduction cells 110 may all be of the same or similar construction, layout and functionality. For example, all transduction cells 110 of transducer matrix film 100 may be formed of the same materials, each may include a strain sensing element and each may transfer sensory data via RF circuitry. Alternatively or additionally, transduction cells 110 may be of varied types and geometries as discussed herein below. For example, transducer matrix film 100 may include interlaced transduction cells 110 that either sense strain or actuate light emitting diodes ("LEDs") or elements of a flexible display or touch screen.

Transducer matrix film 100 may be formed on substrate 120 which may be a flexible material such as metals, textiles, plastics, ceramics, glasses, polyimide, polyamide, polyethylene terephthalate ("PET"), PVDF, polyethylene, polypropylene, polyaryletheretherketone ("PEEK"), Mylar™ and/or other polymers or composites of any of the aforementioned materials. Substrate 120 may be defined as flexible when a first dimension (e.g., thickness) of substrate 120 is substantially smaller than second and third dimensions (e.g., length and width) of substrate 120. Typical substrate thicknesses may be on the order of tens of microns (e.g., 50 microns or approximately 0.002 inches). Thickness of substrate 120 may be determined appropriately with respect to the needs of an application. A conformal application may require a substrate with high flexibility whereas application to planar rigid surfaces may utilize thicker substrates.

Transducer matrix film 100 may also include interconnects 130 which permit communication between transduction cells 110 and/or external devices (not shown). For illustrative clarity, not all interconnects 130 in FIG. 1 are labeled. Interconnects 130 may be utilized as power interconnects, ground interconnects, signal interconnects, addressing interconnects, intra-cell interconnects and inter-cell interconnects. Interconnects 130 may be electrical interconnects formed from electrically conductive materials such as copper or other metals by sputtering, plating, chemical vapor deposition and/or physical vapor deposition followed by patterning and etching. Alternatively, interconnects 130 may be optical interconnects such as light pipes, fiber optic cables or IR send/receive pairs designed to transport optical signals or RF interconnects for transporting radiative signals.

Connection points 140 may be located with respect to transduction cells 110 to permit connection of external signals such as power, ground and signal (cell addressing and data). Connection points 140 may each be associated with one or more transduction cells 110 and cell addressing and data signals may be time or frequency multiplexed onto common lines. All connections points 140 used for power may be connected via interconnects 130 so that power may be applied at any connection point 140 for supplying entire transducer matrix film 100 with electrical power. In like manner, all connection points 140 used for ground connections may be connected via interconnects 130 as well as all connection points 140 used for signal connections may be connected via interconnects 130. Therefore, each connection point 140 may be considered to be connected to a power, ground, address or signal "bus."

Connection points 140 may be further simplified by using power and ground interconnects as carriers for modulated address and data signals with proper filtering and signal detection. Connection points 140 may be distributed throughout transducer matrix film 100 to allow external connection to any size piece of transducer matrix film. Alternatively, to the use of physical electrical connections, wireless connections in the form of RF or optical may be used to transmit power and signals between external devices (not shown) and transducer matrix film 100 or between transduction cells 110. For example, interconnects 130 may be designed to include RF antennae to permit RF transmission. Likewise for optical transmission, interconnects 130 may be designed to include photodiodes. Transmission elements may also be formed within transduction cells 110 or in other locations on or within substrate 120. External devices used with transducer matrix film 100 may include, but are not limited to, computers, data acquisition systems, microcontrollers, power supplies, humans, animals, robotic operators and/or any other devices or systems for providing power or handling analog or digital signals. External devices may be free-standing devices physically or functionally separable from transducer matrix film 100 or may be integrated or integrable devices such as wristband 1630 described below in association with FIG. 16.

Transducer matrix film 100 may be as large in extent as required or desired. Mass produced sheets of transducer matrix film 100 may be sized using cutting, slitting and/or dicing equipment or may simply be cut with shears. Elements of transducer matrix film 100, such as interconnects 130 and transduction cells 110, may be directly formed on flexible substrate 120 by ink-jet printing technologies such as those available from Kovio of Milpitas, Calif. which provides ink-jet printing for manufacturing circuit components. Alternatively, processes such as those (strained silicon or silicon germanium membranes) developed by researchers at the University of Wisconsin-Madison which permit a thin flexible membrane of material to be removed from the originally thick semiconductor substrate upon which it was originally built, may provide integrated circuits which may be bonded to flexible substrate 120 to form transduction cells 110 of transducer matrix film 100. Roll-to-roll processing technologies and equipment, such as used by Nanosolar, Inc. of San Jose, Calif. for Copper Indium Gallium Selenide photovoltaic technology may be used for forming elements of transducer matrix film 100 and has been shown to provide low cost for large area films.

Figure 2:
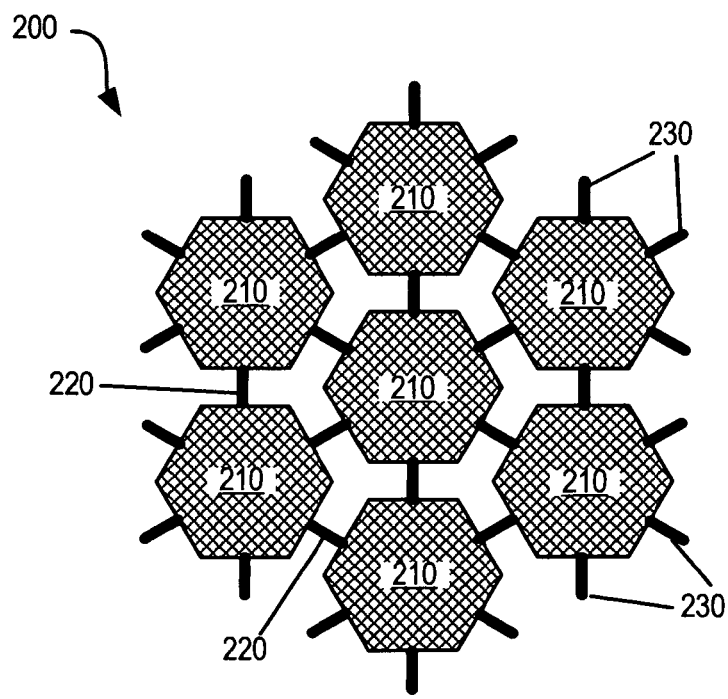
FIG. 2 is a plan view of a portion of transducer matrix film including hexagonal transduction cells organized into a hexagonal array, in accordance with an embodiment.

FIG. 2 shows a plan view of a portion of transducer matrix film 200 including a plurality of hexagonal transduction cells 210 organized into a regular hexagonal array. Interconnects 220 permit communication between transduction cells 210 and/or external devices (not shown). Truncated interconnects 230 may not be used to provide communication to neighboring cells that have been removed from portion of transducer matrix film 200 as shown. However the lack of connected transduction cells to truncated interconnects 230 may permit transduction cells 210 to determine an extent of transducer matrix film 200 and terminate address coding as described herein below. Additionally, truncated interconnects 230 may be used to connect with external devices. Although transducer matrix film 200 is shown in FIG. 2 as a regular array of hexagonal transduction cells 210; it should be understood that any regular or irregular arrangement of transduction cells may be designed and used. Additionally, it should be understood that transduction cells may be of any suitable geometry, size and shape. For example, transducer matrix film may include transduction cells shaped as spherical lunes for conformal application to spherical objects.

Figure 3:
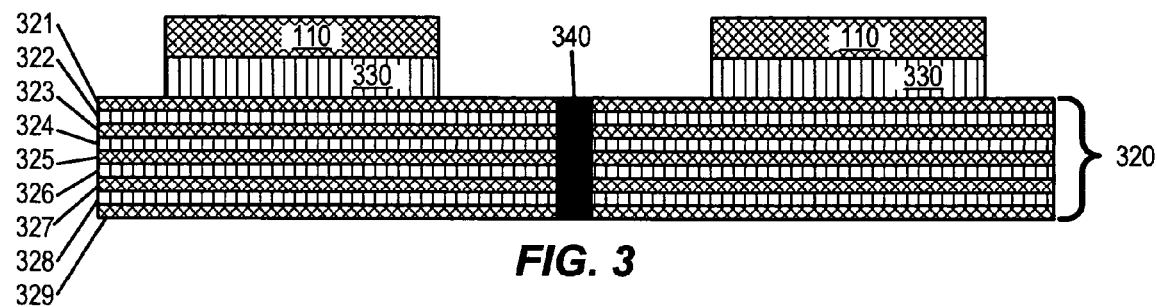
FIG. 3 is a cross-sectional view of a portion of the transducer matrix film of FIG. 1 along section line A-A showing further details of the transducer matrix film, in accordance with an embodiment.

FIG. 3 shows a cross-sectional view of a portion of transducer matrix film 100 of FIG. 1 along section line A-A showing further details of transducer matrix film 100. Transducer matrix film 100 may include any number of transduction cells 110 which may be attached with flexible substrate 320 via interconnection layer 330. Due to the inclusion of semiconductor elements or additional layers of material, transduction cells 110 may be of generally higher modulus than flexible substrate 320. Sizing and positioning of transduction cells 10 and variations in thickness and material of substrate 320 permit variation of the net modulus of transducer matrix film 100 over a wide range based upon the application requirements. It should be noted that for illustrative clarity, elements of FIG. 3 may not be drawn not scale. For example, interconnection layer 330 may be considerably thinner than substrate 320 and/or transduction cell 100. Furthermore, although shown attached with substrate 320 via interconnect layer 320; transduction cells 110 may be directly formed on a surface of or within substrate 320.

Interconnection layer 330 may provide electrical as well as mechanical connection of transduction cells 110 with flexible substrate 320. Interconnection layer 330 may utilize bump bonding, conductive and/or non-conductive adhesives or other methods to provide electrical and mechanical connection for transduction cells 110 with substrate 320. Interconnects which permit communication between neighboring cells and or external devices may be formed within substrate 320 as a series of bonded and patterned conductive layers each isolated by insulating layers. For example, layers 321, 323, 325, 327 and 329 of substrate 320 may be insulating layers. Additionally, layer 322 may be a ground layer, layer 324 may be a power layer, layer 326 may be a address signal layer and layer 328 may be a data signal layer. One or more of connection point 340 may be located with respect to transduction cells 110 to permit connection of external signals such as power, ground, address and data. Connection point 340 may be connected to one or more layers of substrate 320 and multiple connection points may exist for any layer.

Figure 4:
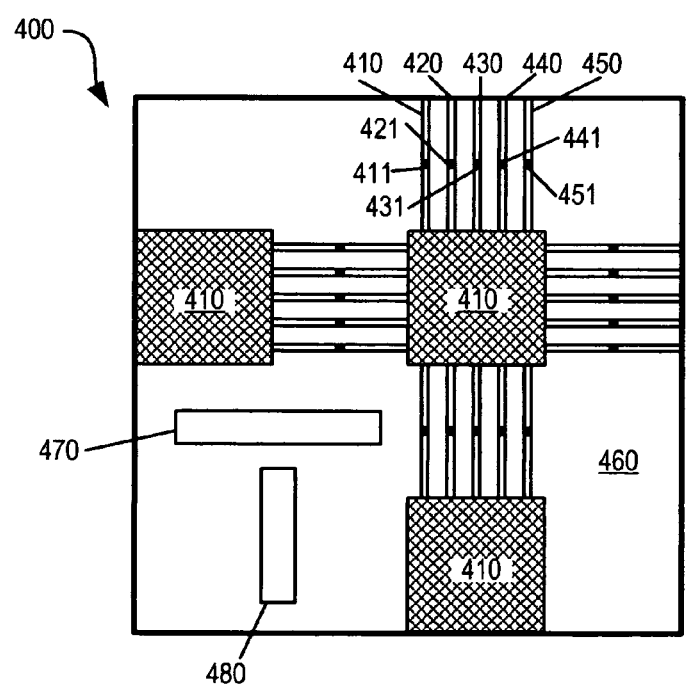
FIG. 4 is a portion of transducer matrix film showing alternate details of interconnects between cells, in accordance with an embodiment.

FIG. 4 shows a portion of transducer matrix film 400 showing alternate details of interconnects between transduction cells 410 and external devices (not shown). Whereas FIG. 3 above describes interconnects formed of layers within a bonded structure of substrate 320. Interconnects 410, 420, 430, 440 and 450 may be formed in a single layer patterned upon a surface of monolithic substrate 460. Although connection points 411, 421, 431, 441 and 451 are shown each localized to a portion of interconnects 410, 420, 430, 440 and 450, respectively; entire surfaces of interconnects 410, 420, 430, 440 and 450 may be designed as connection points. Regardless of where transducer matrix film 400 may be cut, locating interconnects 410, 420, 430, 440 and 450 upon a single surface of substrate 460 may permit ease of connection to external devices since interconnects 410, 420, 430, 440 and 450 and connection points 411, 421, 431, 441 and 451, respectively, may be designed to accept a flexible flat cable connector such as F1-series connectors from JAE Electronics.

In addition or optionally to any transducer elements within transduction cells 410, transducer elements 470 and 480 such as strain gauges may be positioned on any surface of substrate 460 which does not include interconnects 410, 420, 430, 440 and 450 or transduction cells 410. Transducer elements 470 and 480 may be connected with interconnects 410, 420, 430, 440 and 450 or transduction cells 410 via additional interconnects (not shown).

Any of interconnects 410, 420, 430, 440 and 450 may also integrate transducer elements such as strain gauges whereby combining sensory data transduction with signal transport. For example, a strain gauge transducer element may provide an analog signal proportional to an applied strain while transporting a digital signal to an external device. Interconnects shown in FIGS. 4 and 5, such as interconnect 505, may not be required if transduction cells 110 include localized power and signal transmission capabilities such as the RF and optical elements described herein. Furthermore, combinations of layered and single layer interconnects as described in association with FIGS. 3 and 4 may be used.

Figure 5:
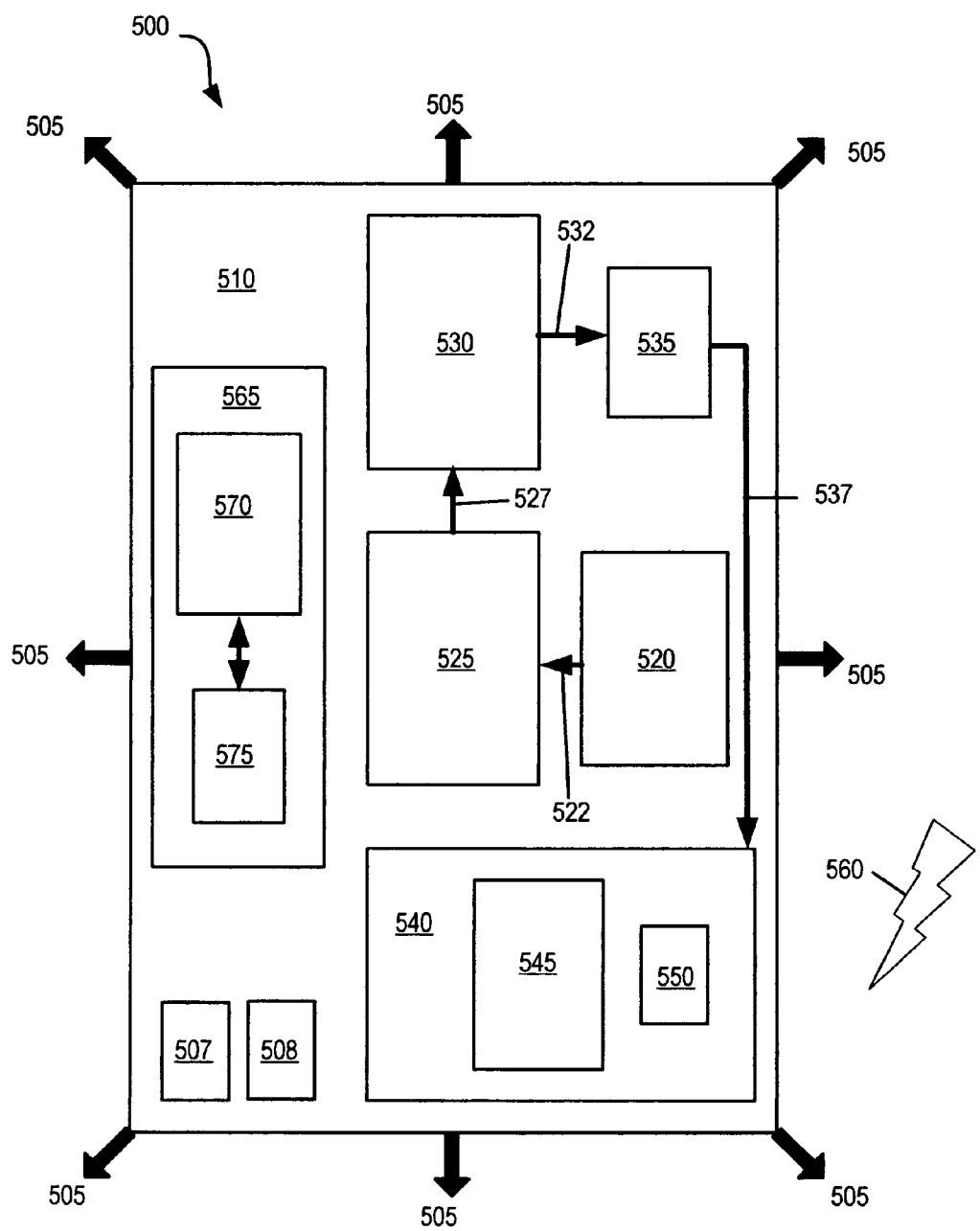
FIG. 5 is a detailed block schematic of elements of a transduction cell of transducer matrix film, in accordance with an embodiment.

FIG. 5 shows a detailed block schematic of components of transduction cell 500 of transducer matrix film such as transducer matrix film 100 of FIG. 1. For illustrative clarity, not all connections between elements are shown in FIG. 5. Transduction cell 500 may be formed upon a surface of substrate 510 that is subsequently bonded with a flexible substrate, such as substrate 460 of FIG. 4, to form an array of transduction cells. Substrate 510 may be, for example, a thinned semiconductor, a portion of a flex-circuit substrate or other substrates described herein, such as substrate 460 of FIG. 4. Transduction cell 500 may be connected with one or more other transduction cells (not shown) or external devices via interconnects 505 (represented by heavy black arrows).

Transduction cell 500 and any elements contained therein may receive power via power elements 507 and 508. For example, power element 507 may be a connection to external power signals and power element 508 may be a connection to external ground signals. Power elements 507 and 508 may be connected to any of interconnects 505. Alternatively power elements 507 and 508 may include capacitors with photocells or RF antennae which may be used to charge the capacitors whereby eliminating any need for external power connections. Power elements 507 and 508, if configured for use as RF elements, may be multiplexed to both supply power as well as to provide communication ability to/from transduction cell 500 for cell addressing and/or data transfer.

Transduction cell 500 may include one or more transducer element 520 which may be, for example, strain and/or temperature transducing elements such as metallic strain gauges, piezoelectric elements, piezoresistive elements, elastoresistive elements, MEMS structures, heating elements, tunneling magnetoresistive elements, bi-material structures, pressure sensitive ink elements, thermocouples, thermistors, RTDs and/or quantum tunneling transducer devices such as described in U.S. Pat. No. 6,707,308. Transducer element 520 may transduce stimuli including, but not limited to, stress, pressure, shear, strain, light, heat, electromagnetic energy, RF radiation and temperature.

As an example, suitable designs of sensing strain gauge elements produced upon flexible substrates are available from Omega Engineering, Inc. of Stamford, Conn. including series SGD of 5 micron thick Constantan foil on 20 micron thick polyimide substrate and KFG series of 6 micron thick Constantan foil on 15 micron thick Kapton substrates. Additionally or alternatively, transducer element 520 may be an actuating element such as a thin film resistive heating element.

Transduction cell 500 or any portion of transducer matrix film may include circuit elements such as logic circuits, processors, digital-to-analog converters, analog-to-digital converters, memory elements, power storage elements, wireless communication elements, RFID elements, optical elements, active electrical elements and passive electrical elements such as described herein. Circuit elements may perform function such as processing signals of transducer elements, identifying positions of transducer elements within an array of transducer elements, simplifying interconnects, communicating amongst transducer elements and communicating with external devices.

Transducer element 520 acting as a sensing transducer element provides signal 522 which may be routed to one or more of signal conditioning element 525. Signal conditioning element 525 may be a device or electrical structure such as Wheatstone bridges, Chevron bridges, 4-wire circuits and constant current sources, passive and/or active electrical circuit elements and electrical filters. Conditioned signal 527 may be routed to analog-to-digital conversion element 530 which converts conditioned signal 527 into a digital signal with a defined bit-depth such as 8 or 12 bits. Analog-to-digital conversion element 530 may be, for example, a linear or logarithmic analog-to-digital converter which provides functionality such as that provided by those available from Analog Devices, Inc. of Norwood, Mass.

Digital signal 532 may be routed to digital signal conditioning element 535 which may, for example, adjust digital signal voltage levels to be compatible with external devices or transmission protocols. Either or both digital and analog signal conditioning may involve changes to signals to account for temperature compensation, signal creep, hysteresis, noise reduction, signal offset and other known factors. Conditioned digital signal 537 may be routed to output signal generation element 540 where it may be encoded for transfer to external devices. Output signal generation element 540 may include functionality such as available in the ADM202 CMOS RS-232 200kBPS Transceiver from Analog Devices, Inc. of Norwood, Mass.

Output signal encoding may incorporate a transduction cell address code with conditioned digital data 537 to provide an output signal on an interconnect 505 and to a connection point such as connection point 140 of FIG. 1. An output signal may also include additional data such as checksums for error detection and/or correction. Transfer of an output signal may be determined by the use polling, triggering or other channel access methods including code domain multiple access ("CDMA"), frequency domain multiple access ("FDMA") and time domain multiple access ("TDMA"). For sequential transfer of signals from one or more transduction cells, timer element 545 may form a unique time delay offset from the origin cell for each cell based upon its cell address code.

Cell triggering for data transmission (send or receive) as well as for data measurement or actuation may be performed by electrical, mechanical, electromagnetic or optical signals dependant upon a triggerable element 550. Triggerable element 550 may be, for example, an electrical contact point for receiving an analog or digital trigger pulse, a mechanical switch, a magnetic pick-up coil, an RF antenna or a photodetector. For example, optical signal 560 may be used to trigger triggerable element 550 which a configured as a photodetector. An analog or digital trigger pulse may be supplied from an external device via any of interconnects 505. Optionally, triggerable element 550 may be a logic circuit that compares a data signal level to a stored or predefined value to decide whether or not to transfer a signal, actuate or measure data.

Transduction cell address code generation element 565 may include processor 570 and memory 575. Processor 570 may be used to calculate cell address codes based upon an origin code and adjacent cell codes all of which may be stored in memory 575. Each cell may store a unique cell address code which may be indicative of its position on a portion of transducer matrix film. Additionally or optionally to elements previously described above, processor 570 may also provide delay generation and signal formatting for output signal generation.

Although described above in association with transducer element 520 as a sensing transducer element, it should be understood that transducer element 520 may be an actuating transducer element. In the case of transducer element 520 being an actuating element; signal communication and functionality of elements may be suitably modified from the above description. For example, instead of receiving an unconditioned signal from sensing transducer element 520; signal conditioning element 525 may provide a conditioned signal to actuating transducer element 520.

Transduction cell 500 may contain any, all or none of the above described elements. Furthermore, elements of transduction cell 500, described above may be considered functional or organizational rather than physical since any or all elements of transduction cell 500 may be included within a single microcontroller such as a PIC or ARM device. Certain elements, such as processor 570, may be shared amongst a group of transduction cells. Localization of elements, described above, to each transduction cell 500 permits operability of any portion of transducer matrix film with at least one cell.

Figure 6:
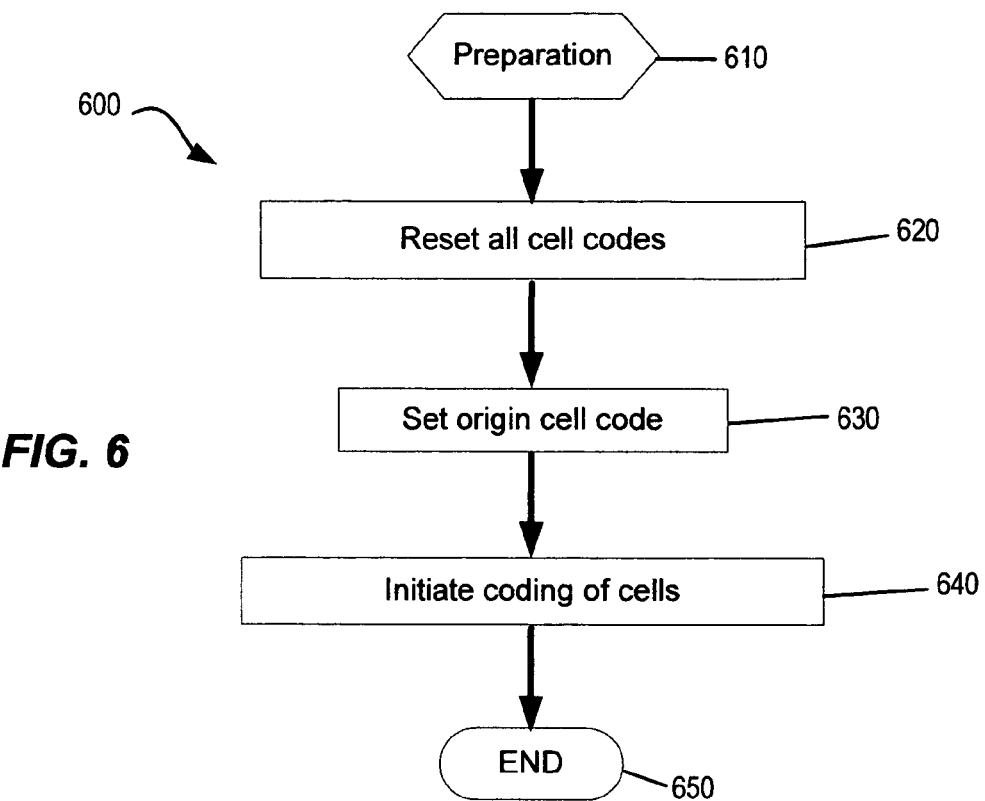
FIG. 6 is a flow chart of a process for address coding of transduction cells of transducer matrix film, in accordance with an embodiment.

FIG. 6 shows a flow chart of a process 600 for configuring and address coding of transduction cells of transducer matrix film. Process 600 prepares a portion of transducer matrix film for use and may be done anytime before use. If memory, such as memory 575 of FIG. 5, included with each transduction cell is non-volatile (i.e., flash memory); cell address codes may be set during manufacture and may remain through the lifetime of transducer matrix film.

Process 600 initiates with step 610 wherein any necessary or optional setup and preparation steps may be performed. Setup and preparation operations may include cutting a portion of transducer matrix film to size; supplying external connections such as power, ground and signal to a portion of transducer matrix film; or charging power capacitors for each cell. Once any preparatory operations are completed; process 600 advances to step 620 wherein one or more cell address codes are reset. A cell address code may be reset by supplying a signal on an interconnect and overwriting an existing cell address code with a default code. For example, all transduction cells may be set with an address code of "88" by introducing a signal onto an interconnect whereby triggering each transduction cell to set its address to "88". By reading adjacent cell address codes each transduction cell is able to determine that cell address codes are in a default state since all cell address codes are identical. Alternatively, a cell address code may be cleared or set into a state where a value is undefined or defined outside of normal bounds. For example, a data register may be set into a tristate condition or a flag variable may be set in memory. In this example, it may not be necessary to reset any cell address codes but set a flag instead.

Next in step 630 an origin cell address code is set into a specific cell that is required or desired to be defined as an origin for a section of transducer matrix film. Origin cell address coding may be performed by electrical, magnetic, mechanical, RF or optical methods. For example, an origin cell address may be set electrically by providing a signal for setting the origin code on an interconnect, such as interconnect 505 of FIG. 5; mechanically by providing a localized application of force or optically using a light signal such as optical signal 560 of FIG. 5. More than one origin cell may be defined.

Subsequent to setting an origin cell code, process 600 advances to step 640 wherein cell address coding of all transduction cells other than an origin cell is initiated. Cell address coding may be performed by introducing a signal on an interconnect to activate all transduction cells to read adjacent cell address codes. Circuit elements in each transduction cell may then determine if that transduction cell is able to determine a cell address code and if so, what the cell address code is.

Figure 7:
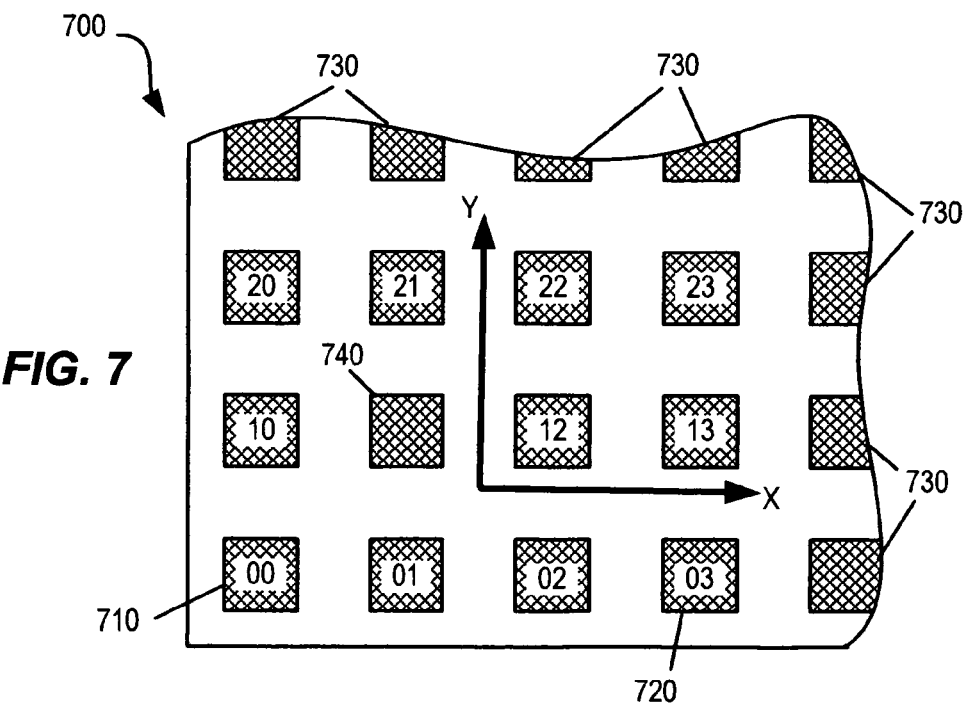
FIG. 7 is a block schematic of a portion of transducer matrix film showing addresses coded via utilizing the process shown in FIG. 6, in accordance with an embodiment.

As an example of cell address coding consider FIG. 7 with all cell address codes, other than the origin cell, initially set to a default value of "88". Once cell address coding is initiated only transduction cells coded as "01" and "10" in FIG. 7 are able to set cell address codes since other transduction cells read the default cell address code from neighboring cells. Once transduction cells address coded as "01" and "10" are cell address coded; transduction cells address coded as "20", "21", "02", and "12" are able to cell address code since these transduction cells will detect cell address codes in certain adjacent transduction cells to be different from the default cell address code. Subsequently transduction cells address coded as "03", "13", "22" and "23" are able to cell address code. Upon successful cell address coding each transduction cell may record its current cell address code into its memory.

The sequence of initiated cell address codings may be automatic for each iteration or successive signals may be introduced via interconnects and for each signal sent each transduction cell determines if it can assign a cell address code and what the cell address code may be. Each iteration of cell address coding expands the group of address coded cells from an origin cell until all available or active transduction cells have a unique address code. Process 600 terminates with end step 650 following cell address coding of all available or active transduction cells. Step 650 may include actions such as testing a section of transducer matrix film prior to use.

FIG. 7 shows a block schematic of a portion of transducer matrix film 700 showing cell addresses coded via utilizing process 600 shown in FIG. 6. Since transducer matrix film 700 is organized into a regular rectangular array, cell address codes may be encoded using a simple Cartesian addressing scheme as shown in FIG. 7. Origin cell 710 is defined as cell address code "00" and other transduction cells may be defined with respect to their ordinal offset from origin cell 710 projected along orthogonal axes XY as indicated. For example, transduction cell 720 is cell address coded as "03" since it is located along the same row (Y=0) as origin cell 710 and is three units removed from origin cell 710 along the X-axis (X=3). Although origin cell 710 is shown located in a corner of transducer matrix film 700, it may be located at any transduction cell position containing an active transduction cell. Furthermore, more than one origin cell may be defined for any portion of transducer matrix film.

Inactive transduction cells 730 may not be cell address coded either due to an inability of cell address coding as a result of damage due to cutting or due to lack of interconnects (not shown) which inhibit the ability to determine a cell address code. Transduction cell 740 although not proximate to a cut edge of the film may be otherwise inactive and therefore not cell address coded. It should be noted that cell address coding functionality can determine the existence of inactive transduction cell 740 and permit appropriate cell address coding for other transduction cells.

Alternatively cell address coding may not follow a Cartesian addressing scheme and transduction cells adjacent to inactive transduction cell 740 may transmit information regarding that transduction cell 740 is inactive whereby maintaining the ability to properly positionally reconstruct any data. For known arrangements of cells, such as the regular array shown in FIG. 7, cell address coding may not be required and sequential ordering may provide inherent row/column addressing although additional row/column addressing interconnects may be required.

Figure 8:
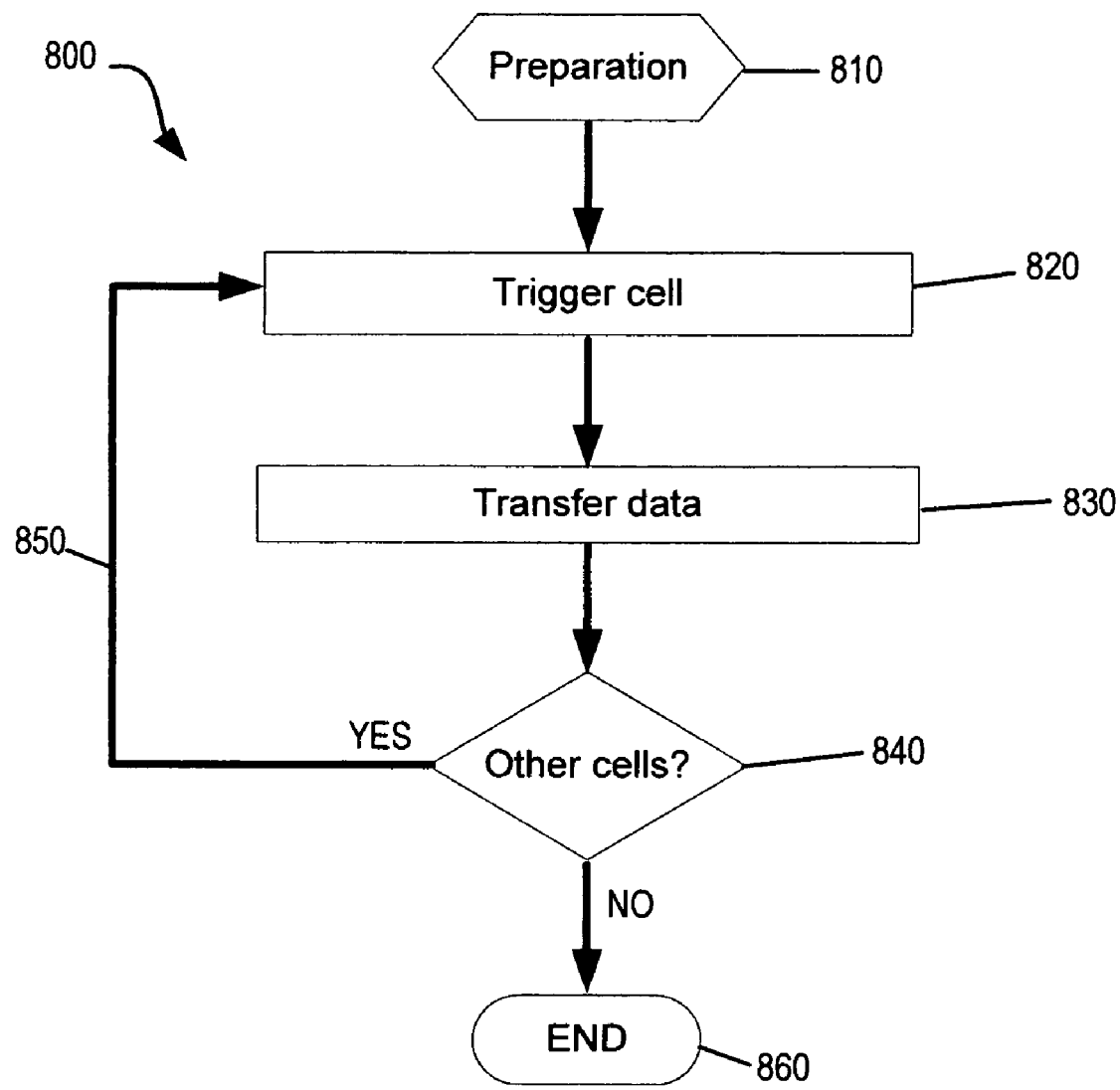
FIG. 8 is a flow chart of a process for transferring data to/from transducer matrix film, in accordance with an embodiment.

FIG. 8 shows a flow chart of a process 800 for transferring data to/from transducer matrix film. Process 800 initiates with step 810 wherein any necessary or optional setup and preparation steps may be performed. Setup and preparation operations may include cutting a portion of transducer matrix film to size, applying external power, ground and signals to a portion of transducer matrix film, charging power capacitors for each cell and/or performing cell address coding as described herein above with respect to FIGS. 6 and 7.

Subsequent to any preparatory steps, process 800 advances to step 820 wherein a trigger signal is introduced to each cell. A trigger signal may be a digital electrical signal on an interconnect which includes a cell address code or other data permitting a specific transduction cell (or group of transduction cells) to respond. Alternatively or optionally, a trigger signal may be introduced to any transduction cell by shining a light of a certain frequency, such as 800 nm infrared ("IR") light, on one or more transduction cells. A photodetector on any transduction cell, such as triggerable element 550 of FIG. 5, which receives light may activate that transduction cell. In this way selected portions of transducer matrix film may be triggered and an entire transducer matrix film does not have to be accessed. Furthermore, any portion of transducer matrix film may be self-triggered based upon sensory data transduced by the transducer matrix film.

Following application of a trigger signal, process 800 advances to step 830 wherein transfer of data is initiated. When a transduction cell receives a trigger signal, it may wait a certain period of time based on its unique cell address code and then send or receive a signal containing a cell identifying address code, a data signal and error detection and/or correction information. A unique delay determined for each transduction cell may prevent multiple signals to/from multiple transduction cells being on interconnects simultaneously. Transducer matrix film may also incorporate a software flow control protocol such as XON/XOFF as is used for modem control or other protocols to permit multiple external devices and/or multiple transduction cells to share signal interconnects.

Process 800 continues to step 840 and determines if more transduction cells require data transfer. If more transduction cells require data transfer, process 800 returns to step 820 via loop 850 and another transduction cell is triggered; otherwise, if no more transduction cells require data transfer, process 800 advances to step 860 and data transfer is terminated. Although described above with respect to data transfer, process 800 may also be used for triggering measurement by or actuation of transduction cells of transducer matrix film. For example, a series of triggers may be sent to a transduction cell to initiate a series of measurements, of which an average value may be transferred at a later time.

Figure 9:
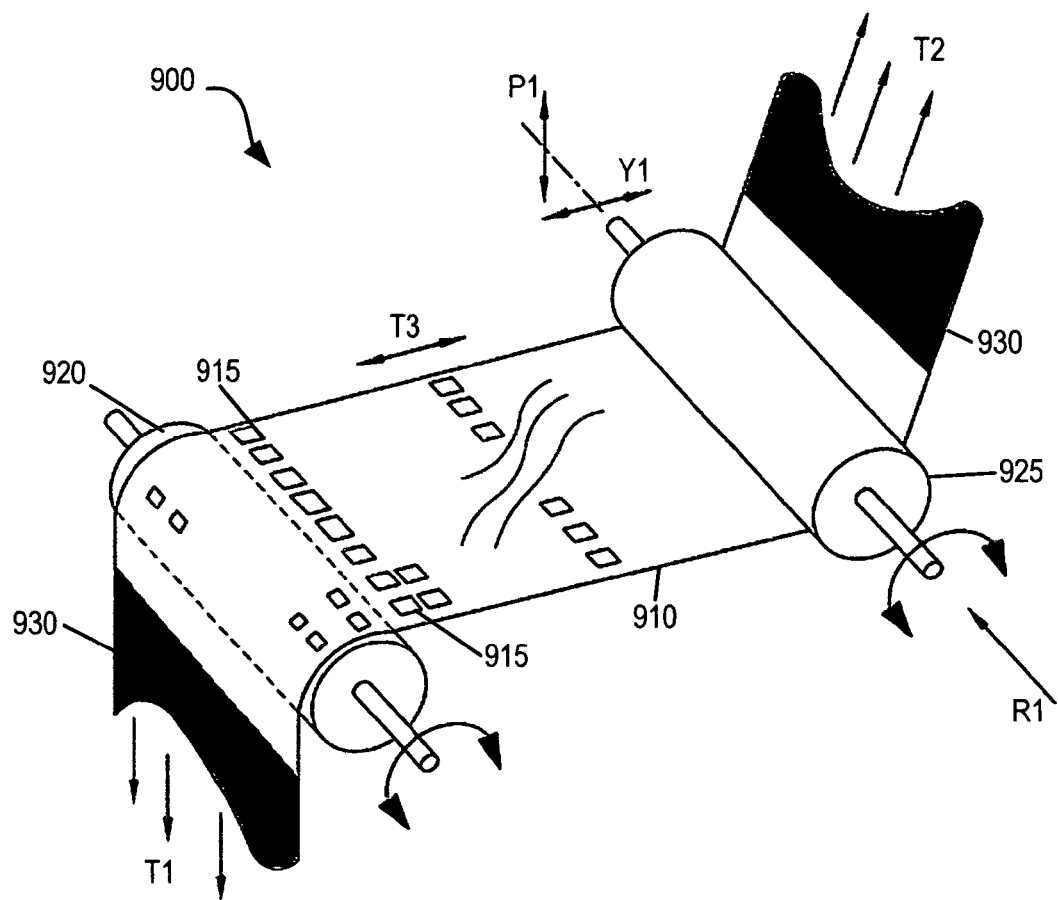
FIG. 9 is a simplified three dimensional view of a roll-to-roll processing machine utilizing transducer matrix film, in accordance with an embodiment.

FIG. 9 shows a simplified three dimensional view of an exemplary roll-to-roll processing machine 900 utilizing transducer matrix film 910 spliced into process film 930. A roll-to-roll processing machine may be defined as any machine that unrolls a process film, performs actions on that process film and then re-rolls the process film. A process film for use with a roll-to-roll processing machine may be defined as a material that has one of its 3 dimensions substantially smaller than the other 2 dimensions. Process film may be made from metal, polymers, paper, cloth, etc. or combinations thereof. Examples of roll-to-roll processing machines include, but are not limited to, machines for processing paper (printing presses and paper making machines), tape processing machines, flex-circuit processing machines, metal film processing machines, converter machines, flexible semiconductor processing machines, solar cell fabrication machines and machines for protective films, plastics and textiles. Other machines that are not roll-to-roll machines but which however utilize rollers to manipulate process films may utilize transducer matrix film 910 as discussed below.

As shown in FIG. 9, roll-to-roll processing machine 900 has rollers 920 and 925 which support, guide and/or change direction of process film 930 as it is processed. Alignment of rollers 920 and 925 may be important to ensure that process film 930 tracks properly through machine 900. For example, process film 930 should not ride off an end of roller 920 or 925, should be even (no wrinkles), should not "bag" due to low or no tension areas and should not break due to excessive localized tension above a yield point of process film 930.

Example tensions applied to transducer matrix film 910 and process film 930 are denoted T1, T2 and T3. Tension T1 may be associated with the drag associated with a "take-off" roll (not shown) and an acceleration of process film 930 through machine 900. Tension T2 may associated with the wind-speed associated with a "take-up" roll (not shown) and an acceleration of process film 930 through machine 900. Tension T3 (shown in FIG. 9 applied to transducer matrix film 910 in place of process film 930) may be associated with positional and dynamic properties of one or both of rollers 920 and 925. Tension T3 may be a three dimensional tension field affected over all portions of transducer matrix film 910 or process film 930 by parameters of rollers 920 and 925. Eccentricity, rotational speed variation, alignment error, non-cylindricity, slippage between roller and process film and other irregular parameters of rollers 920 and 925 such as static and dynamic properties of roller alignment, roller pressure, roller eccentricity, process film tension, process film tension gradient, roller deflection, roller uniformity, roller-to-film traction, roller-to-film slippage, process film catenary sag and roller diameter which may cause improper processing of process film 930 may be determined by employing transducer matrix film 910 to measure tensions affected by machine 900.

Prior art methods for diagnosis and/or controlling irregular parameters of rollers include aligning rollers in pitch (up and down) and yaw (side to side) axes by leveling (roller pitch axis only), measurement between rollers with "Pi" tape or other mechanical methods, laser alignment using surveying techniques, 3-axis inertial locating systems, etc. For example, roller 925 may be positionally adjusted, relative to roller 920, by moving roller 925 along pitch axis P1 and/or yaw axis Y1. Existing measurement systems have limitations such as limited physical or line-of-sight access to rollers 920 and 925 or process film 930 which do not allow physical measurement or visual (laser) observation. Additionally, existing measurement systems may be too large or prohibitively expensive to use. Furthermore, existing measurement systems measure positions and parameters of rollers to infer process film tension gradients rather then performing a direct measurement of process film tension. Transducer matrix film 910 including strain sensing transduction cells 915 may directly measure fundamental quantities of process film 930, such as tension gradient which govern operation of roll-to-roll processing machine 900.

Although the foregoing example describes transducer matrix film 910 spliced into film 930, it should be understood that transducer matrix film 910 may be otherwise utilized in machine 900. For example, transducer matrix film 910 may be sized, spliced and used alone or bonded onto a portion of process film 930.

Figure 10:
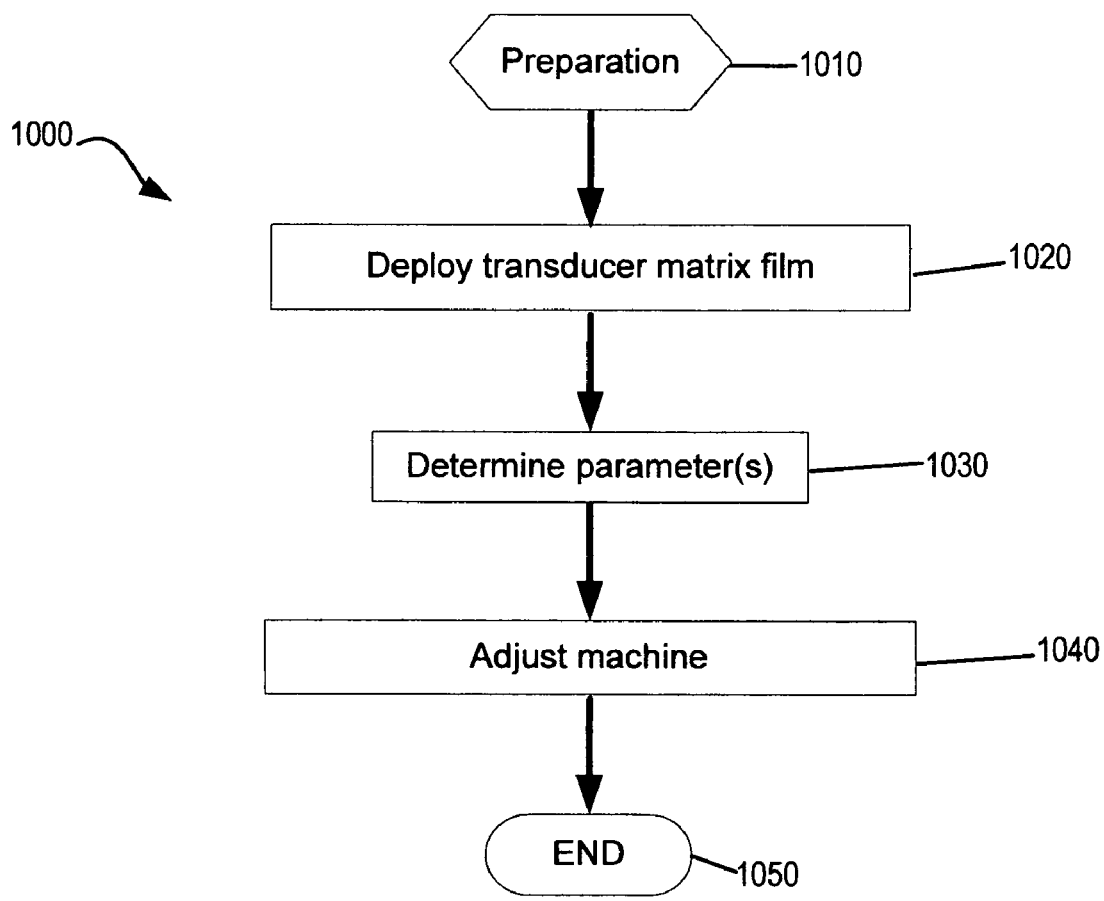
FIG. 10 is a flow chart of a process for configuring a roll-to-roll processing machine using transducer matrix film, in accordance with an embodiment.

FIG. 10 shows a flow chart of process 1000 for configuring or diagnosis of a roll-to-roll processing machine using transducer matrix film. Process 1000 starts with step 1010 wherein any necessary or optional setup and preparation steps may be performed. Setup and preparation operations may include preparation of transducer matrix film as described herein and/or any required initial configuration of the roll-to-roll processing machine such as initial placement and roller alignment. Preparation may also include selecting a transducer matrix film with a tensile modulus of elasticity which is appropriate to the process film to be processed on the machine. Polyimide or Mylar™ may be suitable substrate materials for many applications of transducer matrix film. Stainless steel or other metallic foils may be used as substrates for transducer matrix film if a higher modulus is required.

Process 1000 next advances to step 1020 wherein transducer matrix film is deployed by "threading" into a roll-to-roll processing machine. An active area of transducer matrix film, preferably, should match a width of the intended process film and should be somewhat longer than a maximum distance between any two sequential rollers. However, the active area of transducer matrix film does not have to extend the entire length or width of a process film path through a machine since it may be moved to different areas of the process film path and/or machine as required.

Once a properly sized portion of transducer matrix film has been deployed various processing parameters of a machine may be determined during step 1030 via static and dynamic measurement. For example, a process film including a portion of transducer matrix film may be held static with tension applied at a level applicable to processing of the process film. The tension gradient may then be measured. Other static parameters such as uniformity, diameter and deflection of rollers may be measured utilizing transducer matrix film by fixing the position of transducer matrix film at a set distance from a roller and measuring strains imparted to the transducer matrix film.

For dynamic measurements, transducer matrix film may measure parameters such as process film wrinkling, bagginess, sag and dynamic tension gradients; and time derivatives of any order of the motion of the process film and process film tensions. For example, standing waves may exist in process films while being processed by a machine. Transducer matrix film, substituted for or included with process film may directly measure tensions associated with these standing waves. In another example, inertial and frictional drag forces effecting the spin of a roller may be determined by measuring tension across transducer matrix film before and after a roller at varying linear accelerations of the transducer matrix film. In still another example, transducer matrix film may also be run periodically to collect data for preventative maintenance which may indicate, due to measured changes in tension, that a roller bearing is going "bad" (friction increasing or varying) before it can cause a problem.

After parameters are determined within step 1030, measured parameters and derived values may be used to adjust the processing machine for improved performance during step 1040. A processing machine may be adjusted by modifying machine components such as rollers in pitch and yaw or changing rotational speeds of roller to yield the desired tension gradient across a process film. Alternatively, components of a machine may be replaced, as in the above example of a failing roller bearing, or repaired, as for resurfacing of a roller. Steps 1020, 1030 and 1040 may be iterated for different or same portions of a machine as necessary or desired. Process 1000 terminates with step 1050 wherein any shutdown operations are performed, such as removing transducer matrix film from a machine and performing test runs of process films.

Transducer matrix film may be applied to outer surfaces of objects such as airplanes, cars and boats to determine mechanical forces such as contact or impact and/or fluid-dynamic (aerodynamic and/or hydrodynamic) forces, such as lift, drag or buoyancy forces, affecting the object by measuring resultant strain. Transducer matrix film may be designed to measure strain which is applied in any direction. For example, measured strains orthogonal to the plane of transducer matrix film may be defined as pressure on the transducer matrix film and measured strains in-plane (shear strains) relate to lateral forces parallel to a surface of transducer matrix film. Strain may be measured in three orthogonal directions or may be measured in projected directions such as for aerodynamic streamlines. Transducer matrix film is therefore applicable for evaluation and testing of designs and modifications to objects to replace wind tunnel or other fluid-dynamic testing with real-world measurement under realistic conditions rather than simulated. For example, transducer matrix film applied to a surface of an automobile may be used to transduce data for aerodynamic drag out on the open road and collect data in real-time.

Figure 11:
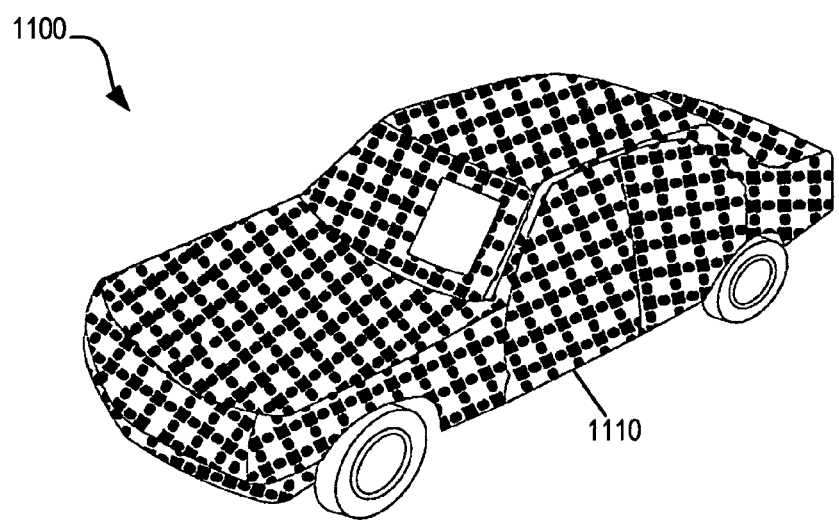
FIG. 11 is a three dimensional view of an automobile showing application of transducer matrix film, in accordance with an embodiment.
Figure 12:
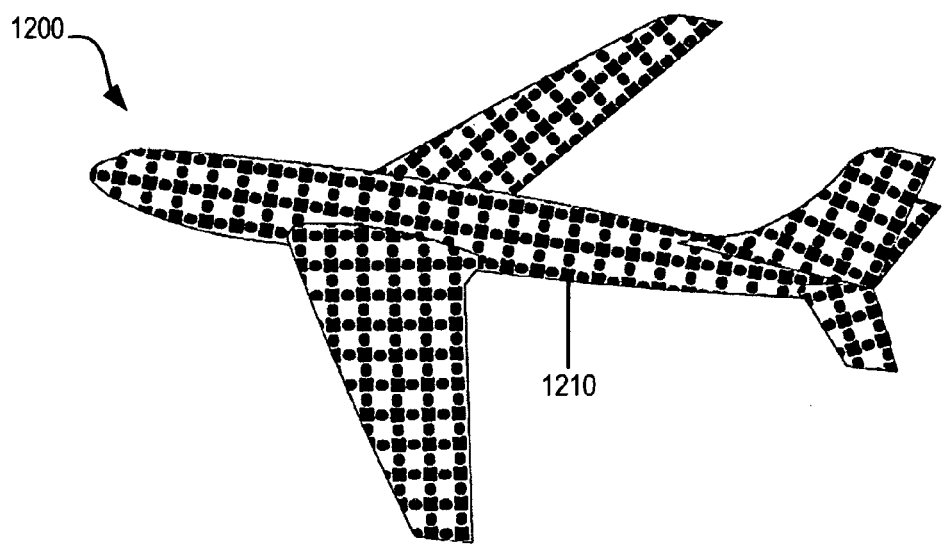
FIG. 12 is a three dimensional view of an aircraft showing application of transducer matrix film, in accordance with an embodiment.

FIG. 11 shows a three dimensional view of automobile 1100 showing application of transducer matrix film 1110. FIG. 12 shows a three dimensional view of aircraft 1200 showing application of transducer matrix film 1210. For visual clarity, elements of transducer matrix films 1110 and 1210 are enlarged in scale with respect to the dimensions of automobile 1100 and aircraft 1200. Although shown in FIGS. 11 and 12, covering most exterior surfaces of automobile 1100 and all exterior surfaces aircraft 1200, respectively; transducer matrix films 1110 and 1210 may be positioned and sized to any portion of automobile 1100 and aircraft 1200. Additionally, sizes and geometries of transduction cells for either transducer matrix film 1110 or 1210 may be sized appropriately for the conditions and/or properties to be measured.

Applied to inner or outer controllable surfaces of wings or fuselage or built into fiberglass composite structures of aircraft; transducer matrix film may be used, in association with an actuator, as a feedback sensor for active control of wings, flaps, rudders, airfoils and fuselage surfaces. Most aircraft currently change the shape of wings and rudders with separate mechanical flaps/rudders. Utilizing transducer matrix film, an aircraft may be designed that has a uninterrupted outer skin and the shape of the aircraft surfaces may be changed by actuation of the surface in response to strain and/or temperature data provided by transducer matrix film as a feedback sensor to an actuation system when a portion of the surface is altered or when acted upon by external forces. Examples of actuators which may be used with transducer matrix film as components of an actuation system may include pneumatic cylinders or bladders; hydraulic cylinders or bladders; or linear or rotational electric actuators. Such actuators may be attached to the outer surfaces of aircraft via linkages or other simple mechanical means to amplify the transduced sensory data from transducer matrix film to the surfaces.

Additionally, measuring lift and aerodynamic forces and pressures in real-time may provide for optimum efficiency and enhanced stability of the aircraft. For example, transducer matrix film may be applied to currently existing variable wing aircraft or to "lifting body" aircraft such as the B2 bomber to monitor strains and temperatures effecting outer surfaces as a safety system. Additionally, new variable wing aircraft designs may be enabled by transducer matrix films. Transducer matrix film may also be used to detect wing icing by monitoring changes in pressure, tension or temperature of a wing surface due to ice build-up or thermally induced contraction.

A transducer matrix film including both strain sensing elements and actuating heating elements may be able to automatically detect icing and heat a wing surface. This design of transducer matrix film may form a self-contained and stand-alone transducer system which may not require the use of external devices except for, potentially, initial cell addressing or other configuration.

In addition to aircraft, transducer matrix film may be used to actuate controllable surfaces of fluid-dynamically controllable vehicles such as automobiles, gliders, drones, motorcycles and watercraft. Applied to airdams, spoilers or other deformable outer surfaces of automobile 1100, transducer matrix film 1110 may be used to control the drag and down force in real time based on feedback from transducer matrix film 1110.

Figure 13:
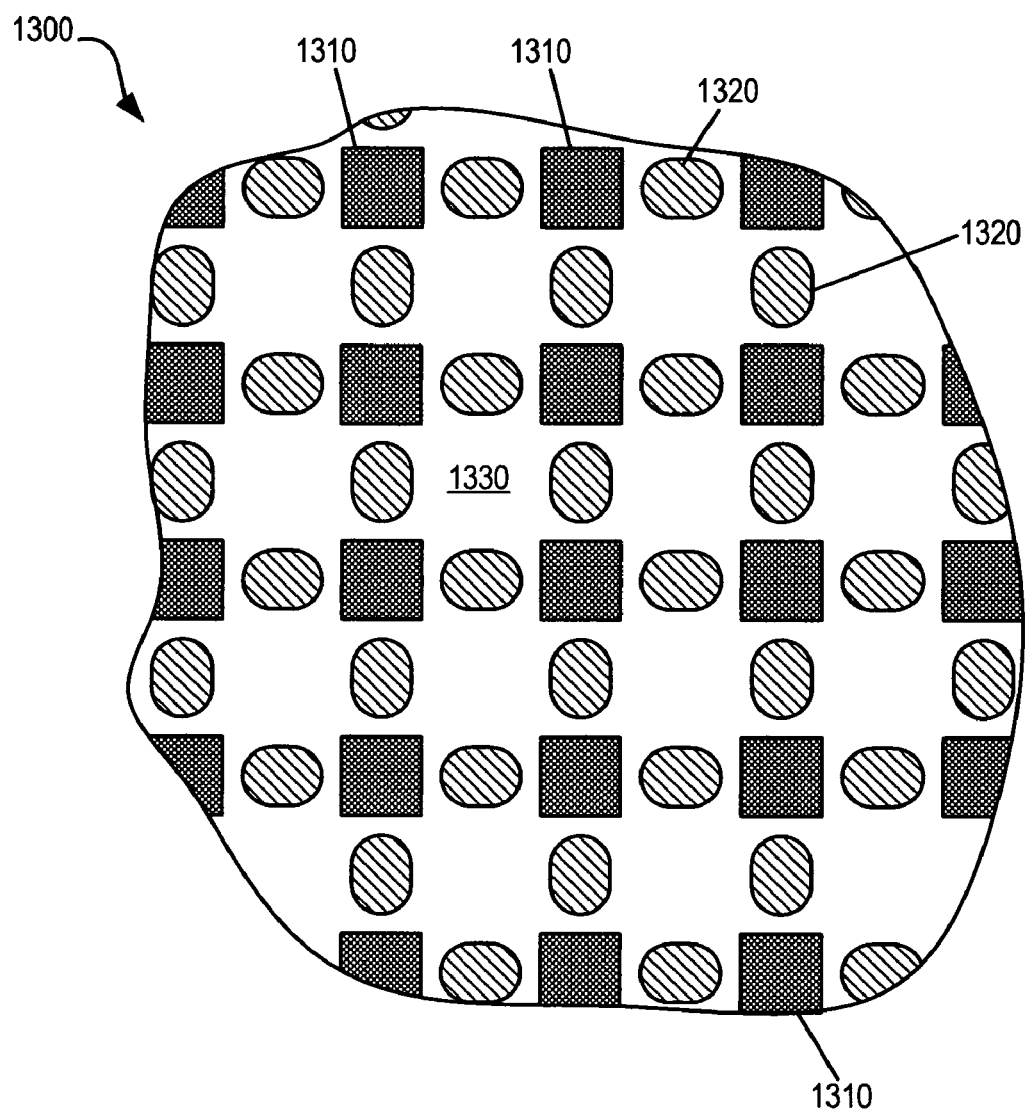
FIG. 13 is a plan view of a portion of transducer matrix film with extended elastic properties, in accordance with an embodiment.

FIG. 13 shows a plan view of a portion of transducer matrix film 1300 with extended elastic properties. Transducer matrix film 1300 may include one or more transduction cells 1310 and one or more transducer elements 1320 located on flexible substrate 1330. For illustrative clarity, not all transduction cells 1310 and transducer elements 1320 are labeled. Transducer elements 1320 may be sensing transducer elements such as strain gauges or thermocouples or actuating transducer elements such as thin film resistive heating elements.

The modulus of elasticity of transducer matrix film 1300 may be designed to vary within different regions of transducer matrix film 1300. For example, due to the presence of the elements of transduction cell 1310, such as described above in association with transduction cell 500 of FIG. 5; a modulus of elasticity of regions including transduction cells 1310 may be greater than a modulus of elasticity of regions including transducer elements 1320. Furthermore, a modulus of elasticity of regions of bare substrate 1330 may be less than that of regions including transducer elements 1320. Locating transducer elements 1320 directly on substrate 1330, rather than within transduction cells 1310 may minimize an area required by transduction cells 1310 whereby decreasing a net modulus of elasticity of transducer matrix film 1300. Furthermore, locating transducer elements 1320 directly on substrate 1330 may increase a range of operation for and/or a sensitivity of transducer elements 1320. Substrate 1330 may be formed of multiple layers and certain layers may of high modulus and others of low modulus materials. Regions of high modulus material may be etched or otherwise removed to adjust modulus for different regions of transducer matrix film 1300. Alternatively, additional layers of high modulus material may be bonded or otherwise attached to adjust modulus for different regions of transducer matrix film 1300.

Although shown in FIG. 13 as a regular square array, transduction cells 1310 and transducer elements 1320 may be arranged in any other pattern as necessary or desired. Interconnects (not shown) including power, ground and signal may extend from transducer elements 1320 to transduction cells 1310. Connection points (not shown), such as described herein above, may be supplied on a surface of transducer matrix film 1300.

Transducer matrix film with extended elastic properties may be useful for application to or as articles including, but not limited to, clothing, footwear, bands, gloves, belts and/or medical appliances intended for humans or animals. Transducer matrix film 1300 may measure and record strain and/or temperature data as a human or animal moves. Alternatively or optionally, transducer matrix film 1300 may actuate visual or heating transducer elements.

Figures 14, 15:
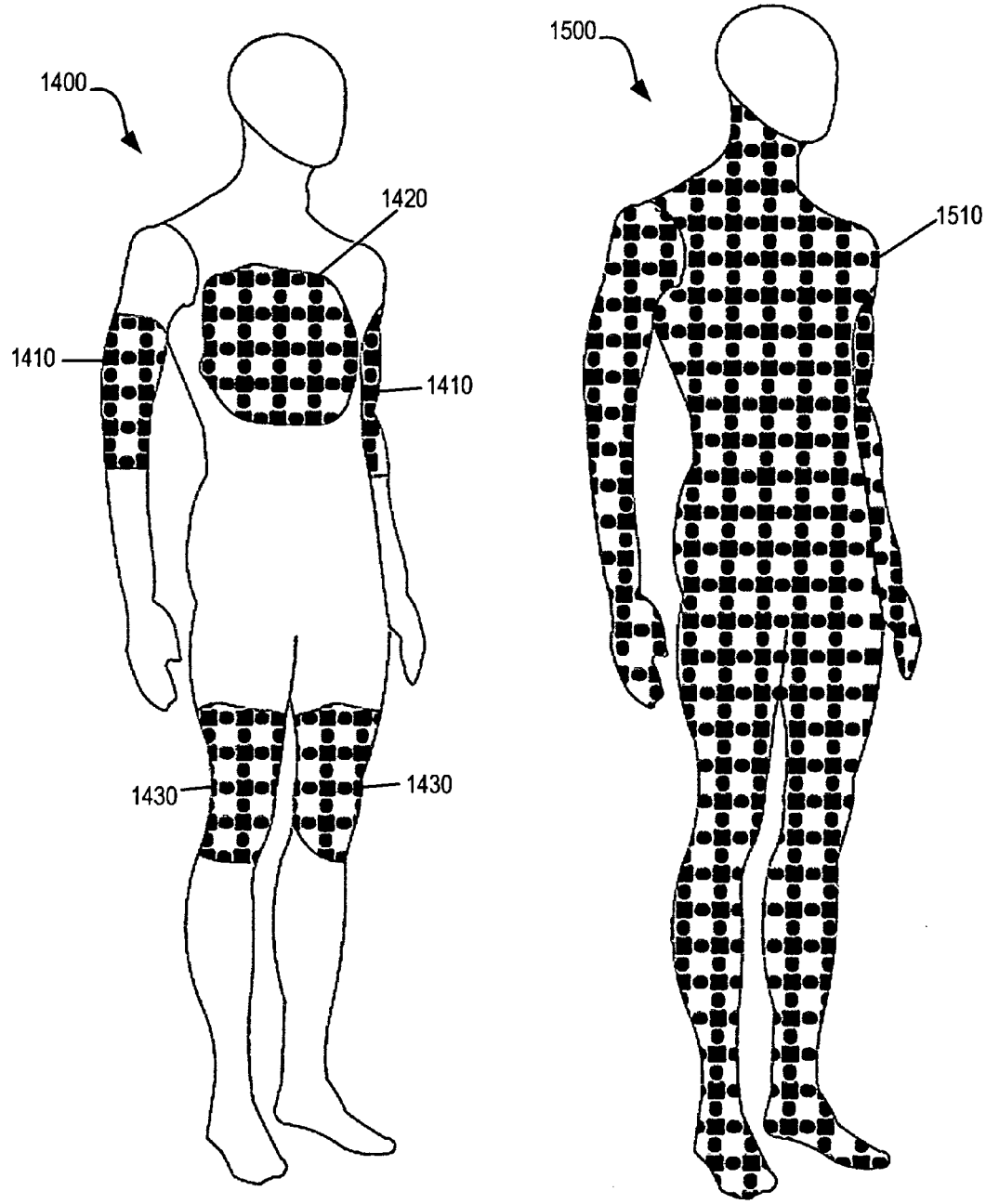
FIGS. 14 and 15 are three dimensional views of humans showing applications of transducer matrix film, in accordance with an embodiment.

FIGS. 14 and 15 show three dimensional views of humans 1400 and 1500 showing applications of transducer matrix film. As a body moves strain varies over the body surface and may be monitored by transducer matrix film. Transducer matrix film may be independently designed or integrated with a material such as elastane with a modulus which may allow full movement but may remain under stress while making the intended measurements.

Human 1400 may have multiple sections of transducer matrix film 1410, 1420 and 1430 positioned upon and formed to fit their body as a medical appliance to measure or actuate sensory data. Transducer matrix film 1410, formed as an arthroscopic elbow support, may be located proximate to elbow regions of the body to monitor elbow motion related to normal motion, performance study or rehabilitation from injury such as tendonitis. Additionally or optionally, transducer matrix film 1410 may actuate and supply heat or cool the elbow region. Transducer matrix film 1420, acting as a plethysmograph, may be located across a chest portion of human 1400 to monitor breathing or other chest motion of a distance runner or cyclist. Transducer film 1430, formed as an arthroscopic knee support, may be located proximate to one or more of the knees of human 1400 to monitor swelling and temperature following arthroscopic surgery. For these applications, transducer elements of transducer matrix film 1400 may include both strain and temperature sensing elements and/or actuating elements such as electrical contacts for electrostimulation.

Turning now to FIG. 15, human 1500 may wear a full garment 1510 made from or incorporating transducer matrix film. Garment 1510 may be designed to fit human 1500 by incorporating transducer matrix film as part of a elastane or neoprene garment such as an athletic bodysuit or diving wetsuit, respectively. As described above, all or any portion of transducer matrix film forming garment 1500 may be activated and used. Garment 1500 may include segmented transducer matrix film which may be localized (have origin cells) to regions such as shown in FIG. 14. From strain data measured by transducer matrix film, a 3D strain model of a contacted body portion may be derived. Such sensory data may be used to increase the fidelity of computer generated imagery ("CGI") for video game graphics or computer generated images for movies. Furthermore, such sensory data may be used for real-time interaction with and/or control of video games or other entertainment systems. For unrestricted movement or remote application, garment 1510 and/or transducer matrix films 1410, 1420 and 1430 may include portable external devices such as battery packs, data recorders and wireless data transmission. Furthermore, capabilities such as data transmission and storage may be provided by mobile smartphone systems or other mobile devices. Although shown in FIG. 15, as being worn by a human, garment 1510 may be designed and used for animals.

Figure 16:
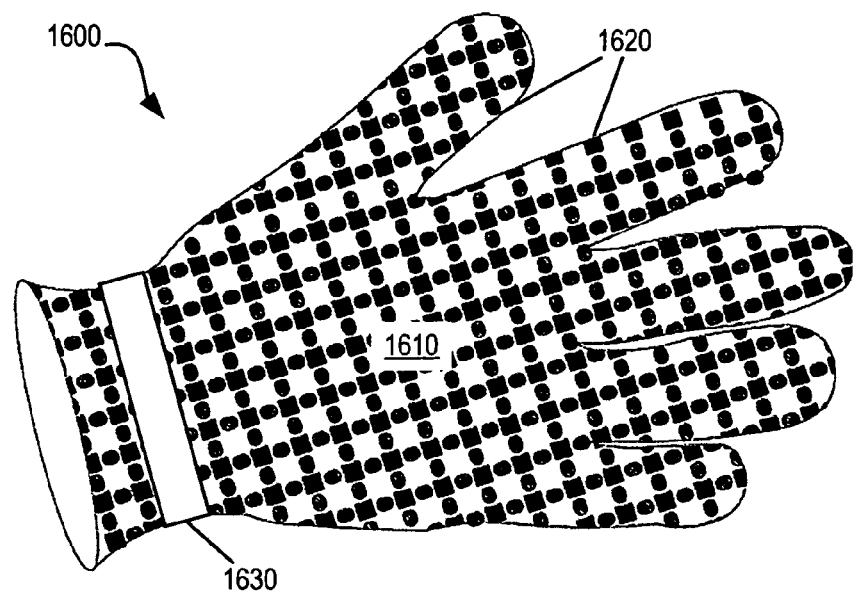
FIG. 16 is a three dimensional view of an article fabricated from transducer matrix film, in accordance with an embodiment.

As an example of an article for sensory transduction, FIG. 16 shows a three dimensional view of glove 1600 fabricated from transducer matrix film 1610. Glove 1600 may be fabricated from transducer matrix film 1610 formed on a suitable substrate such as elastane or may be applied to a secondary substrate such as leather, nitrile rubber, latex, cloth or other textile. Optionally, transducer matrix film 1610 may be coated with a compliant material such as latex or rubber to protect transducer matrix film 1610 and to provide benefits of common gloves such as wear- or water-resistance. As described herein above, transduction cells of transducer matrix film 1610 may be designed to automatically cell address code. Seams typically located on the interdigital surfaces, such as interdigital surface 1620 between the thumb and index finger, of glove 1600 may permit cell address coding of the palm-side and dorsal surfaces of glove 1600 separately with origin cells defined independently for each finger.

Any combination of shapes of transduction cells and transducer elements may be used for glove 1600. For example, higher density (smaller sized) transduction cells and/or transducer elements may be formed within transducer matrix film 1610 in areas of glove 1600 near fingertips whereby providing greater sensitivity. Transducer matrix film 1610 may include transduction cells and/or transducer elements for sensing temperature and/or strain. Additionally or optionally, transducer matrix film 1610 may include transduction cells and/or transducer elements for actuating heat or electrical stimulation for muscle rehabilitation for hand injury.

Due to the design of transducer matrix film 1610, a minimum number of connections to external devices may be required; namely power, ground and signal. An external power pack and/or mobile computing device may be used to provide these connections. Alternatively, power and signal transfer may be designed into wristband 1630 including an embedded power pack, microprocessor and RF wireless communication to external devices such as a mobile phone. Transduction cells within transducer matrix film 1610 may be defined to provide a continuously variable output for induced strain or temperature or may be designed to produce a thresholding signal. For example, a glove designed for safety may include temperature sensing transducer elements and circuitry which signals when a temperature is above a safe value for a wearer.

Glove 1600 may also me used as flexible sensory "smart skin" for a prosthesis or robotic element such as a cybernetic hand permitting imaging of force distributions for robotic gripping applications. In another example, a prosthesis may include transducer matrix film as part of its external surfaces for providing a simulated sensor of touch or contact. For example, an artificial foot may be covered by transducer matrix film providing sensory data about gait, foot pressure and other information to effect or improve rehabilitation.

Figure 17:
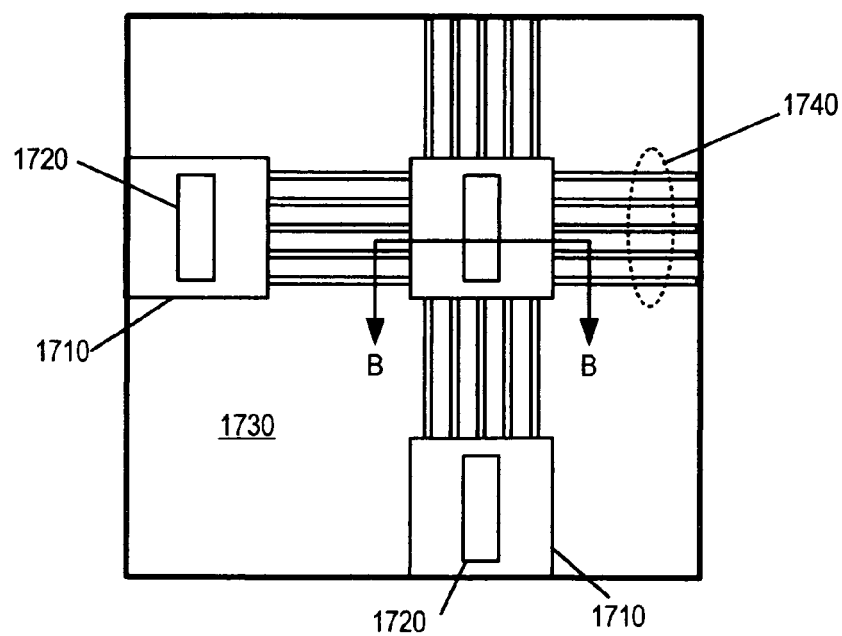
FIG. 17 is an plan view of a portion of transducer matrix film from the article of FIG. 16, in accordance with an embodiment.

FIG. 17 shows an enlarged plan view of a portion of transducer matrix film 1610 from glove 1600 of FIG. 16. Transducer matrix film 1610 may include any number of transduction cells 1710 arranged in a regular square array as shown in FIG. 17 or in other geometries as described herein. Transduction cells 1710 may additionally or optionally include raised features 1720 which are described herein below in association with FIGS. 18 and 19. Interconnections 1740 may be located within or upon a surface of substrate 1730. Substrate 1730 is not required to be a continuous material but may be woven materials such as textiles, non-woven materials such as felts or banded/open materials such as meshes as long as regions of the substrate are provided for locating transduction cells 1710 and interconnections 1740. Additionally or optionally, transducer elements (not shown) may be formed on regions of substrate 1730 not occupied by transduction cells 1710 and/or interconnections 1740.

Figure 18:
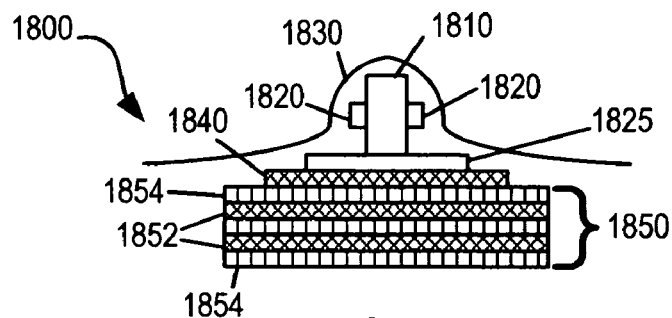
FIGS. 18 and 19 are cross-sectional views of the portion of transducer matrix film of FIG. 17 along section line B-B showing alternate construction details of the transducer matrix film, in accordance with an embodiment.
Figure 19:
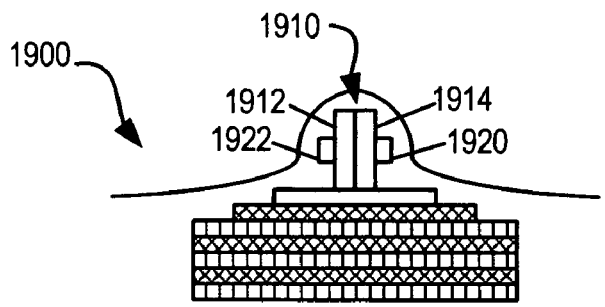

FIGS. 18 and 19 show enlarged alternate construction cross-sectional views of the portion of transducer matrix film shown in FIG. 17 along section line B-B showing further details. Transduction cell section 1800 includes a raised feature 1810 which may be contacted by one or more transducer elements 1820 and 1825. Raised feature 1810 may be a "bump" or a "ridge" depending upon the spatial extend of feature 1810. A "ridge" shaped form of raised feature 1810 may approximate transducing capabilities of a fingerprint ridge. Transducer elements 1820 and 1825 may be strain or temperature elements such as described herein. Raised feature 1810 and transducer elements 1820 and 1825 may be covered by or encapsulated within a flexible dielectric material 1830 that provides sensory transport (suitably flexible with a sufficiently large heat transfer coefficient) while providing electrical isolation for any elements of transduction cell section 1800. Transducer elements 1820 and 1825 may be configured to be sensitive to lateral and normal application of force/pressure and measure the corresponding resultant strain. Alternatively, transducer elements 1820 and 1825 may be actuated to supply lateral and/or normal forces. Furthermore, transducer elements 1820 may be actuated to provide lateral forces while transducer element 1825 is actuated to provide an increase in temperature.

Transduction cell section 1800 further includes elements 1840, such as elements described above in association with FIG. 5, which may be formed upon a section of semiconductor material such as silicon. Transduction cell section 1800 may be mounted upon a layered substrate 1850. Layered substrate 1850 may include any number of layers such as conducting layers 1852 providing signal and power paths as well as dielectric layers 1854 providing isolation for any conducting layers. Alternatively, layered substrate 1850 may be replaced with a single layer with conducting traces patterned onto one or more surfaces or encapsulated therein.

Transduction cell section 1900 may include an additional variation from transduction cell section 1800. Raised feature 1910 of transduction cell section 1900 may be divided in a plurality of vertically oriented layers 1912 and 1914 so forming a multi-layer structure which provides response to lateral strains or temperature. For example, if raised feature 1910 includes only two layers 1912 and 1914 which are formed from materials of different coefficients of thermal expansion ("CTE"); raised feature 1910 may sense temperature from the resultant induced strain difference between transducer elements 1920 and 1922. For example, when the CTE of layer 1912 is greater then the CTE of layer 1914, raised feature 1910 will flex toward the right of FIG. 19. The resultant thermally induced strain may be in addition to any strain induced by application of normal or lateral forces to raised feature 1910.

Figure 20:
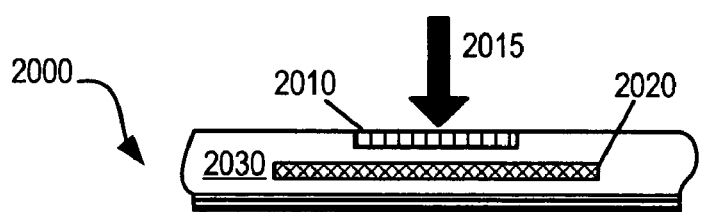
FIGS. 20 and 21 are cross-sectional views of a portion of transducer matrix film showing alternate construction details of the transducer matrix film, in accordance with an embodiment.
Figure 21:
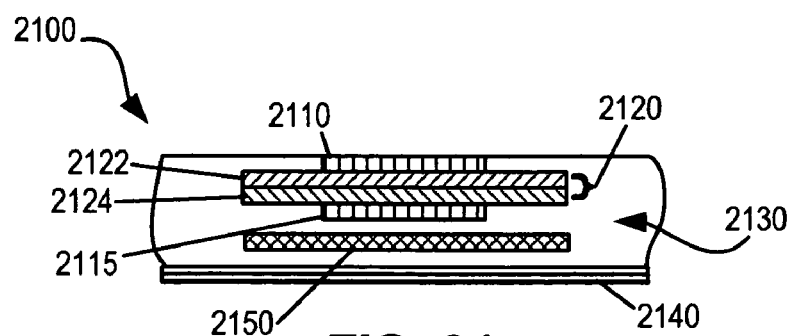

FIGS. 20 and 21 show cross-sectional views of a portion of transducer matrix film showing alternate construction of transducer matrix film. Transduction cell sections 2000 and 2100 do not include raised features which may be included in the transduction cell sections of FIGS. 18 and 19. Transduction cell section 2000 may include a transducer element 2010 which may sense temperature or applied strain 2015 normal to the surface (indicated by black arrow). Transduction cell section 2000 may also include elements 2020, such as elements described above in association with FIG. 5, which may be formed upon a section of semiconductor material such as silicon. Transduction cell section 2000 may be encapsulated with dielectric material 2030 and located upon substrate 2040.

Transduction cell section 2100 is an alternate construction to transduction cell section 2000. Transduction cell section 2100 may include transducer elements 2110 and 2115 located proximate to a material bilayer 2120 which provides response to normal strains or temperature. For example, if layers 2122 and 2124 of bilayer 2120 are formed from materials of different coefficients of thermal expansion ("CTE"); bilayer 2120 may sense temperature from the resultant induced strain difference between transducer elements 2110 and 2115. For example, when the CTE of layer 2122 is greater then the CTE of layer 2124 bilayer 2120 may deform (concave-down) toward substrate 2140. Optionally transducer elements 2110 and 2115 may be actuated to provide displacement. Transduction cell section 2100 may be encapsulated with dielectric material 2130 and located upon substrate 2140. Elements 2150, such as elements described above in association with FIG. 5, may be formed upon a section of semiconductor material such as silicon.

Figure 22:
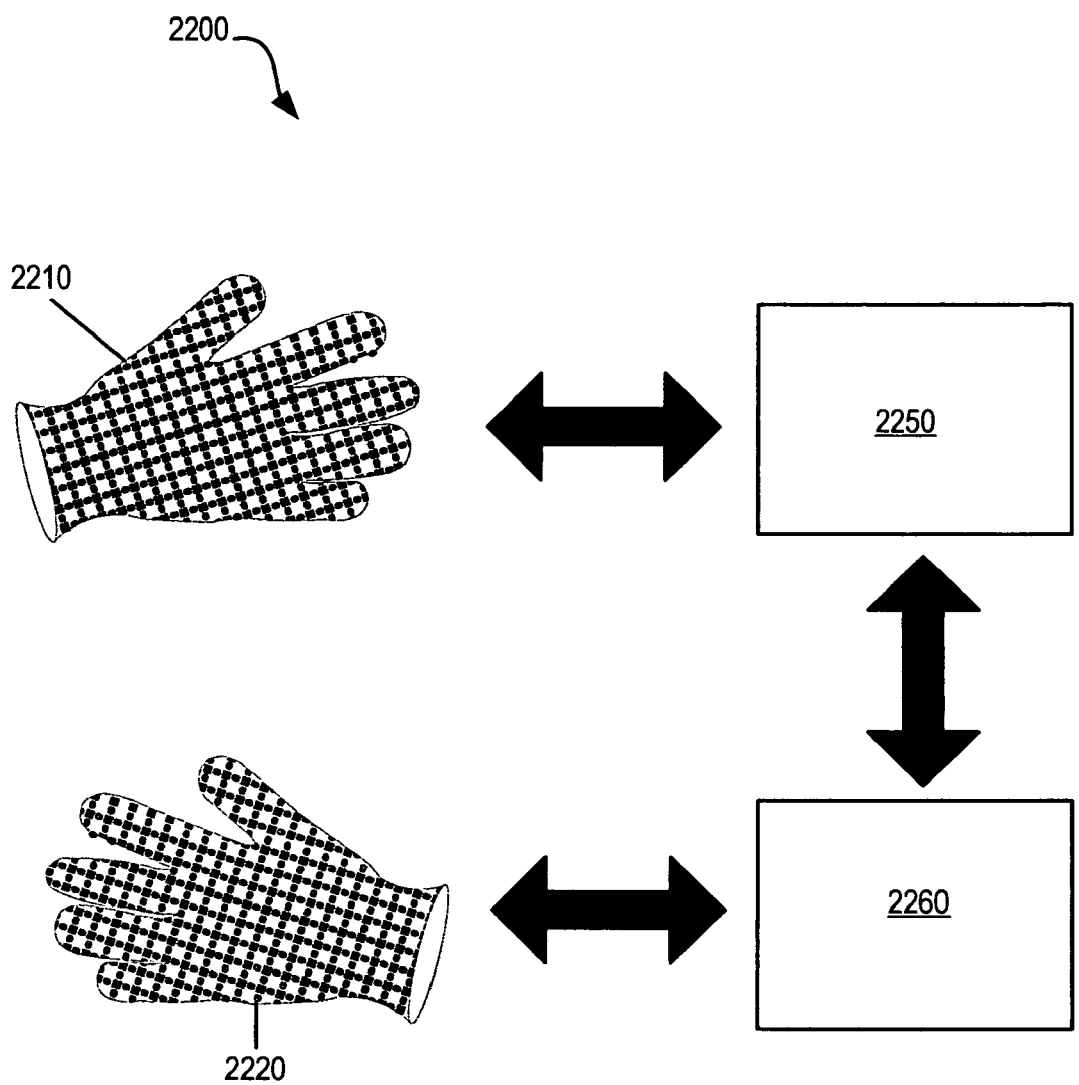
FIG. 22 is a block diagram of a system for sensory communication, in accordance with an embodiment.

FIG. 22 shows a block diagram of system 2200 for sensory communication. Although shown in FIG. 22 as including two input/output devices 2210 and 2220, system 2200 may include any number of input/output devices utilizing transducer matrix film for sending (measuring) and/or receiving (actuating) sensory data. Sensory data may include force, mechanical pressure, acoustic pressure, stress, strain, temperature, chemical activity, light intensity, electrical signal values and other sensory information. Input/output devices 2210 and 2220 may be unidirectional (send or receive only) or bidirectional (send and receive). Devices 2210 and 2220 may be constructed such as glove 1600 of FIG. 16 for sensory communication between two humans or between one human and a robotic device. In another example, device 2210 may be transducer matrix film 1430 of FIG. 14 or garment 1510 of FIG. 15 and device 2220 may be glove 1600 worn be a medical practitioner for use as part of a telemedical application permitting palpation of a patient's knee. Used as an input/output device, transducer matrix film may be associated with any living or inanimate object and may be fixed to or embedded within any appropriate surface or volume.

For each input/output device 2210 and 2220, system 2200 may include external devices 2250 and 2260, respectively for communication and power support. External devices 2250 and 2260 may be, for example, internet connected devices such as laptop computers or wireless networked devices such as mobile phones. External devices 2250 and 2260 may include wired or wireless communication devices and capabilities such as ZigBee, WiFi, RS232 and/or Bluetooth. External devices 2250 and 2260 may provide power support in the form of batteries, photovoltaic elements, capacitive storage, wireless RF power transmission or wired power sources. Each external device 2250 and 2260 may communicate with each other or with each input/output device 2210 and 2220 by wired or wireless capabilities.

Although transducer matrix film may be directly used in a sensory communication system such as system 2200; transducer matrix film may be used in association with a secondary system, actuator or device, responsive to the transducer matrix film that amplifies or modifies the sensory data provided by or received by the transducer matrix film. In the telemedical palpation example discussed herein above a medical practitioner may wear input/output device 2220 in the form of glove 1600 to palpate a deformable facsimile of a human knee. Input/output device 2220 may directly measure forces applied to the facsimile by the medical practitioner. Additionally or optionally, sensory feedback may be applied between the facsimile and device 2220 which may further incorporate data from device 2210 such as temperature data.

Since transducer matrix film in the form of a medical appliance such as shown by transducer matrix film 1430 of FIG. 14 may not be able to actuate the same forces as are provided by the medical practitioner; device 2210 may be utilized as part of a feedback system for a mechanical device or second person for actuating the forces equivalent to those effected by the practitioner. For example, device 2210 may include a transducer element such as an LED for visual indication that signals a human operator to apply less or greater force. The led may be lit when the applied force is within a specified range or percentage error of the force applied by the practitioner.

If used with a mechanical actuator instead of a human actuator, transducer matrix film used with device 2210 may include additional features, such as electrical contact points, permitting communication to external devices. For example, force actuation for the palpation may be supplied by a electromechanical or pneumatic device designed like a "bed-of-nails" which includes a number of small independent force actuators. Electrical contact points on transducer matrix film may mate with contact points on the device permitting signals received by the transducer matrix film to actuate the device. Additionally, signals for driving actuators of a device may be conditioned and processed by the transducer matrix film. In a further example, force actuation for the palpation may be supplied by a robotic hand which simulates or exceeds the dimensions and strength of a human hand, enclosed by glove 1600 of FIG. 16. Examples of actuators which may be used with the robotic hand and transducer matrix film as components of an actuation system may include pneumatic cylinders or bladders; hydraulic cylinders or bladders, linear or rotational electric actuators and/or electroactive polymer actuators. Such actuators may be attached to articulated digits or other points of motion of the robotic hand via linkages or other simple mechanical means to amplify the forces conveyed from transducer matrix film to the surface under palpation.

Input/output devices 2210 and 2220 made from transducer matrix film may have any combination of sensing and actuating transducer elements. Actuators designed into transducer matrix film may include piezoelectric, polymer, resistive, memory metal, electroactive polymer actuators or other types which actuate when a signal is applied to change shape, expand, contract, heat and/or cool. An actuating transducer element may be mechanically designed to amplify applied movement, enhance measurement, or provide feedback capabilities. For example, glove 1600 of FIG. 6, may include a bilayer structure of sensing transducer matrix film and an actuating transducer matrix film. The sensing transducer matrix layer may contact a human hand and the actuating transducer matrix film may be contacting any object. Although described above with respect to a palpation example, it should be understood that system 2200 may be used for other sensory communication which conveys sensory data such as for application of force to any object.

Figure 23:
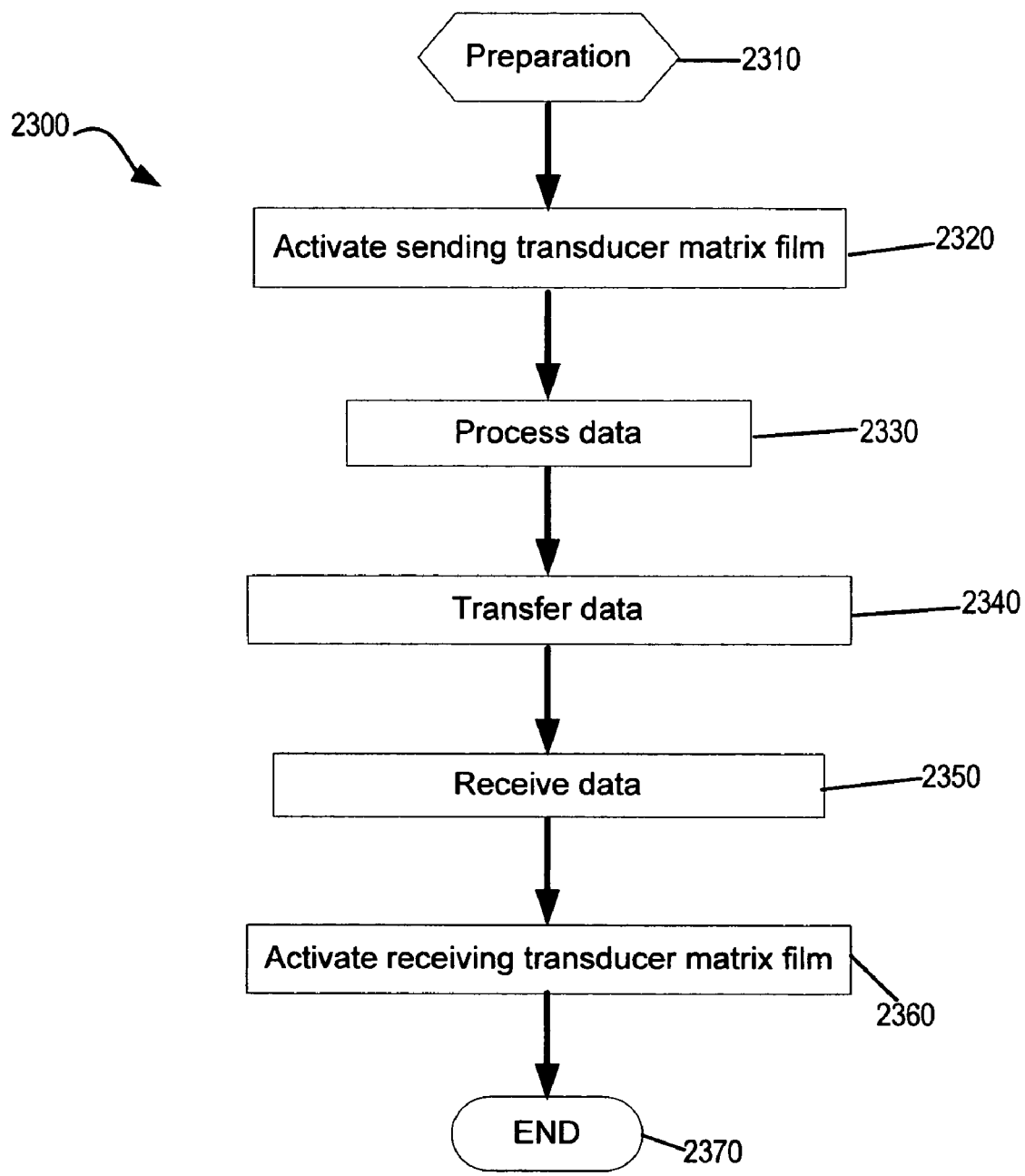
FIG. 23 is a flow chart of a process for sensory communication, in accordance with an embodiment.

FIG. 23 shows a flow chart of process 2300 for sensory communication. Process 2300 starts with step 2310 wherein any necessary or optional setup and preparation steps may be performed. Setup and preparation operations may include preparation of transducer matrix film as described herein and/or any required initial setup of communications or signal processing. Process 2300 next advances to step 2320 wherein a sending transducer matrix film is activated. A sending transducer matrix film, such as glove 1600 of FIG. 6 may be activated by triggering as described herein above or optionally may be in a constant state of periodic or aperiodic measurement. Once measurements have been taken and/or recorded, process 2300 advances to step 2330 wherein data measured by the transducer matrix film is processed. Data processing, such as signal averaging of multiple measurements, may be internal to transducer matrix film and effected by an element such as processor 570 of FIG. 5 or may be effected by an external device such as a mobile phone.

Process 2300 next advances to step 2340 wherein processed data is transferred. Data may be transferred by methods and systems, such as internet wireless or wired communications or others such as described herein. Process 2300 next advances to step 2350 wherein transferred data is received and processed for use by a receiving transducer matrix film such as incorporated in input/output devices 2210 and 2220 of FIG. 22. Process 2300 next advances to step 2360 wherein the receiving transducer matrix film is actuated based upon the received data. The receiving transducer matrix film may be self-actuated upon receipt of data or may require triggering from an external device or by an operator. After data has been received and processed, process 2300 terminates at step 2370. Process 2300 may transfer measurement data in real-time or may provide for temporary or permanent storage of data.

The changes described above, and others, may be made in the transducer matrix film systems described herein without departing from the scope hereof. For example, although certain examples are described in association with roll-to-roll processing equipment, it may be understood that the transducer systems described herein may be adapted to other types of processing equipment such as industrial presses for metal stamping and for any application where stresses, strains, pressures and/or temperature require measurement. Furthermore, transducer systems as described herein may include one or more types of transducer matrix film with one or more types of transducer elements. A transducer matrix film may form a self-contained transducer system or external devices may be required for the transducer system. External devices for a transducer system may be permanently or temporarily connected with transducer matrix film. For example, transducer matrix film including temperature sensing elements and heat actuating elements may form a stand-alone thermal transducer system. However, external devices, such as a computer, may require temporary connection to the transducer matrix film for defining temperature set points.

Additionally, although certain embodiments are described herein in association with measurement of stresses, strains, pressures and/or temperature as sensory data, it may be understood that the systems described herein may include other sensors such as optical, magnetic, RF, proximity and/or any other sensor type known in the art or hereinafter developed. Multiple sensors, of the same or different types as those mentioned above, may also be combined within a transducer matrix film system. For example, a system including strain and proximity sensors may be used to determine information such as weight, general shape and contact point geometry of objects. Additionally, the functionality of any transducer matrix film may be modified by substitution of any sensing transducer element for an actuating transducer element of like or different type.

It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A transducer system comprising: a plurality of transduction cells formed on a flexible substrate; localized circuit elements formed within each of said plurality of transduction cells; a plurality of interconnects associated with said plurality of transduction cells; and means for defining an origin cell, for setting an origin cell address code and for cell address coding provided within each of said plurality of transduction cells.

2. The transducer system of claim 1, wherein said flexible substrate is formed from a material selected from the group consisting of metals, textiles, plastics, polymers, rubbers, woven materials, non-woven materials, polyimides, polyamides, PET, PVDF, polyethylenes, polypropylenes, PEEK, Mylar™, ceramics, glasses and composite materials.

3. The transducer system of claim 1, wherein said plurality of transducer elements is organized into an array.

4. The transducer system of claim 1, further comprising an external device connected with said interconnects.

5. The transducer system of claim 1, wherein each of said transduction cells incorporates a transducer element selected from the group consisting of sensing transducer elements and actuating transducer elements.

6. The transducer system of claim 1, wherein each of said transduction cells transduces a stimulus selected from the group consisting of stress, pressure, shear, strain, light, heat, electromagnetic energy, RF radiation and temperature.

7. The transducer system of claim 1, wherein said interconnects are selected from the group consisting of power interconnects, ground interconnects, signal interconnects, addressing interconnects, intra-cell interconnects and inter-cell interconnects.

8. The transducer system of claim 1, wherein said interconnects are selected from the group consisting of electrical interconnects, optical interconnects, light pipes, IR send/receive pairs and RF interconnects.

9. The transducer system of claim 1, wherein said circuit elements are selected from the group consisting of logic circuits, processors, digital-to-analog converters, analog-to-digital converters, memory elements, power storage elements, wireless communication elements, RFID elements, optical elements, active electrical elements and passive electrical elements.

10. The transducer system of claim 1, wherein said circuit elements include means for a function selected from the group consisting of processing signals of said transduction cells, identifying relative positions of said transduction cells within an array of said transduction cells, simplifying said interconnects, communicating amongst said transduction cells and communicating with external devices.

11. A method for transducing a stimulus using a transducer system comprising providing a plurality of interconnected transduction cells; supplying connections to, defining an origin cell of, setting an origin cell address code within, and initiating cell address coding of said transduction cells; deploying said transducer system; triggering said transducer system and transducing a stimulus with said transducer system.

12. The method of claim 11, wherein said triggering further comprises a signal selected from the group consisting of TDMA signals, FDMA signals, CDMA signals, electrical signals, mechanical signals, electromagnetic signals and optical signals.

13. A method for sensory communication comprising providing a first transducer system as a first plurality of interconnected transduction cells; supplying connections to, defining a first origin cell of, setting a first origin cell address code within, and initiating cell address coding of said first plurality transduction cells; processing a signal from said first plurality of interconnected transduction cells; transferring said signal after processing to a second transducer system provided as a second plurality of interconnected transduction cells; supplying connections to, defining a second origin cell of, setting a second origin cell address code within, and initiating cell address coding of said second transduction cells; and controlling said second transducer system in response to said signal.

14. A method for diagnosis of a processing machine comprising initially configuring said processing machine; providing a transducer system as a plurality of interconnected transduction cells; supplying connections to, defining an origin cell of, setting an origin cell address code within, and initiating cell address coding of said transduction cells; deploying said transducer system and determining at least one processing parameter of said processing machine.

15. The method of claim 14, wherein said processing machine is selected from the group consisting of roll-to-roll processing machines, printing presses, paper making machines, tape making machines, flex-circuit processing machines, solar cell fabrication machines, converter machines and flexible semiconductor processing machines.

16. The method of claim 14, wherein said processing parameter is selected from the group consisting of static and dynamic properties of roller alignment, roller pressure, roller eccentricity, process film tension, process film tension gradient, roller deflection, roller uniformity, roller-to-film traction, roller-to-film slippage, process film catenary sag and roller diameter.

17. The method of claim 14, wherein said deploying said transducer system comprises adapting the transducer system for use in said processing machine by at least one process selected from the group consisting of sizing said transducer system, splicing said transducer system and bonding said transducer system.

18. A method for measuring forces applied to an object comprising;
providing a transducer system as a plurality of interconnected transduction cells; supplying connections to, defining an origin cell of, setting an origin cell address code within, and initiating cell address coding of said transduction cells; deploying said transducer system onto a surface of said object and transducing force data with said transducer system.

19. A fluid-dynamically controllable vehicle comprising a controllable surface of said vehicle, a plurality of transduction cells formed on a flexible substrate attached to said controllable surface; localized circuit elements formed within each of said plurality of transduction cells; a plurality of interconnects associated with said plurality of transduction cells;
means for defining an origin cell, for setting an origin cell address code and for cell address coding provided within each of said plurality of transduction cells; and an actuator for controlling said controllable surface in response to said transduction cells.

20. The fluid-dynamically controllable vehicle of claim 19, wherein said vehicle is selected from the group consisting of automobiles, aircraft, gliders, drones, motorcycles and watercraft.

21. A medical appliance comprising a plurality of transduction cells formed on a flexible substrate formed to fit a portion of a body; localized circuit elements formed within each of said plurality of transduction cells; a plurality of interconnects associated with said plurality of transduction cells; means for defining an origin cell, for setting an origin cell address code and for cell address coding provided within each of said plurality of transduction cells; and an external device for controlling said plurality of transduction cells.

22. An article for sensory transduction comprising: a plurality of transduction cells formed on a flexible substrate; localized circuit elements formed within each of said plurality of transduction cells; a plurality of interconnects associated with said plurality of transduction cells; means for defining an origin cell, for setting an origin cell address code and for cell address coding provided within each of said plurality of transduction cells; and an external device for controlling said plurality of transduction cells and said localized circuit elements.

23. The article of claim 22, wherein said article is selected from the group consisting of clothing, footwear, medical appliances, belts, bands and gloves.

24. The article of claim 22, wherein said article is designed for at least one of humans and animals.

25. The article of claim 22, wherein said article provides data for at least one of computer generated imagery, video games and entertainment systems.

26. The article of claim 22, further comprising an actuator responsive to said article for modifying sensory data transduced by said article.

27. The article of claim 26, wherein said article forms at least one of a prosthesis and a robotic element.

28. The article of claim 22, wherein said at least one of said transduction cells transduces a stimulus selected from the group consisting of stress, pressure, shear, strain, electromagnetic energy, light, heat, RF radiation and temperature.

29. A system for sensory communication comprising a first plurality of transduction cells formed on a flexible substrate; first localized circuit elements formed within each of said first plurality of transduction cells; a first plurality of interconnects associated with said first plurality of transduction cells; means for defining a first origin cell, for setting a first origin cell address code and for cell address coding provided within each of said first plurality of transduction cells; a first external device connected with said first plurality of transduction cells, a second external device in communication with said first external device and a second plurality of transduction cells formed on a flexible substrate; second localized circuit elements formed within each of said second plurality of transduction cells; a second plurality of interconnects associated with said second plurality of transduction cells; means for defining a second origin cell, for setting a second origin cell address code and for cell address coding provided within each of said second plurality of transduction cells; and said second plurality of transduction cells connected with said second external device.

* * * * *